US011269042B2

(12) United States Patent
Kishigami

(10) Patent No.: US 11,269,042 B2
(45) Date of Patent: Mar. 8, 2022

(54) RADAR APPARATUS AND TARGET DETERMINATION METHOD

(71) Applicant: PANASONIC INTELLECTUAL PROPERTY MANAGEMENT CO., LTD., Osaka (JP)

(72) Inventor: Takaaki Kishigami, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 288 days.

(21) Appl. No.: 16/580,032

(22) Filed: Sep. 24, 2019

(65) Prior Publication Data

US 2020/0096595 A1    Mar. 26, 2020

(30) Foreign Application Priority Data

Sep. 25, 2018 (JP) .............................. JP2018-179096

(51) Int. Cl.
*G01S 3/20* (2006.01)
*G01S 7/295* (2006.01)
*G01S 13/58* (2006.01)

(52) U.S. Cl.
CPC ................ *G01S 3/20* (2013.01); *G01S 7/295* (2013.01); *G01S 13/582* (2013.01)

(58) Field of Classification Search
None
See application file for complete search history.

(56) References Cited

U.S. PATENT DOCUMENTS

| 2015/0204966 A1* | 7/2015 | Kishigami | G01S 13/02 |
| | | | 342/189 |
| 2017/0254879 A1* | 9/2017 | Tokieda | G01S 7/352 |
| 2018/0120427 A1* | 5/2018 | Cornic | G01S 13/4463 |

FOREIGN PATENT DOCUMENTS

| JP | 2013-113723 A | 6/2013 |
| JP | 2014-153088 A | 8/2014 |
| JP | 2016-114468 A | 6/2016 |
| JP | 2017-053685 A | 3/2017 |

OTHER PUBLICATIONS

Kronauge et al., "Fast Two-Dimensional CFAR Procedure", IEEE Transactions on Aerospace and Electronic Systems, vol. 49, No. 3, Jul. 2013, pp. 1817-1823.

(Continued)

*Primary Examiner* — Whitney Moore
(74) *Attorney, Agent, or Firm* — Greenblum & Bernstein, P.L.C.

(57) ABSTRACT

Radar receiver calculates a first reception power in each of a predetermined number of beam directions by using a reflected wave signal in a first cell among a plurality of cells into which a region represented by at least one of a distance component and a Doppler frequency component is divided, calculates a second reception power on the basis of reception powers of reception array antennae by using the reflected wave signal in a peripheral cell of the first cell among the plurality of cells, and determines whether or not a target is present in the first cell on the basis of a comparison result between the first reception power and a first threshold value that is a value obtained by multiplying the second reception power by a first coefficient.

18 Claims, 16 Drawing Sheets

(56) References Cited

OTHER PUBLICATIONS

Cadzow, "Direction-of-Arrival Estimation Using Signal Subspace Modeling", IEEE Transactions on Aerospace and Electronic Systems, vol. 28, No. 1, Jan. 1992, pp. 64-79.
Li et al., "MIMO Radar with Colocated Antennas", IEEE Signal Processing Magazine, vol. 24, Issue 5, Sep. 2007, pp. 106-114.
Japan Patent Office Notice of Reasons for Refusal (English Language Translation), dated Nov. 2, 2021, for the corresponding Japanese Patent Application No. 2018-179096.

* cited by examiner

RADAR APPARATUS AND TARGET DETERMINATION METHOD

TECHNICAL FIELD

The present disclosure relates to a radar apparatus and a target determination method.

BACKGROUND ART

A radar apparatus transmits a radio wave, receives a reflected wave received by a target, and thereby detects a distance to the target on the basis of an arrival delay time of the reflected wave, and can thus detect a relative speed of the target on the basis of a Doppler frequency component of the reflected wave.

In recent years, a radar apparatus using a radar transmission signal of which a wavelength is short, including a radio wave such as a microwave or a millimeter wave enabling a high resolution to be obtained has been examined. In order to improve the safety outdoors, there is the need for development of a radar apparatus (wide-angle radar apparatus) that detects a small object such as a pedestrian or a falling object in a wide-angle range in addition to a vehicle.

A wide-angle radar apparatus may have the following configuration.

There is a configuration using a method (an arrival angle estimation method or direction of arrival (DOA) estimation) in which a reflected wave is received by array antennae including a plurality of antennae (antenna elements), and an arrival angle (arrival direction) of the reflected wave is estimated by using a signal processing algorithm based on a reception phase difference for an element interval (antenna interval). For example, an arrival angle estimation method may include a fast Fourier transform (FFT) method, and a method enabling a high resolution to be obtained may include a Capon method, multiple signal classification (MUSIC), and estimation of signal parameters via rotational invariance techniques (ESPRIT) (for example, refer to NPL 1).

CITATION LIST

Patent Literature

PTL 1
Japanese Patent Application Laid-Open No. 2016-114468

Non Patent Literature

NPL 1
Direction-of-arrival estimation using signal subspace modeling Cadzow, J. A.; Aerospace and Electronic Systems, IEEE Transactions on Volume: 28, Issue: 1 Publication Year: 1992, Page(s): 64 to 79

NPL 2
J. Li, and P. Stoica, "MIMO Radar with Colocated Antennas," Signal Processing Magazine, IEEE Vol. 24, Issue: 5, pp. 106 to 114, 2007

NPL 3
M. Kronauge, H. Rohling, "Fast two-dimensional CFAR procedure", IEEE Trans. Aerosp. Electron. Syst., 2013, 49, (3), pp. 1817 to 1823

SUMMARY

However, a method of estimating an arrival direction of a reflected wave in a radar apparatus has not been sufficiently examined.

Nonlimited Examples of the present disclosure provide a radar apparatus and a target determination method capable of estimating an arrival direction of a reflected wave with high efficiency.

A radar apparatus according to one example of the present disclosure includes: transmission circuitry that transmits a radar signal by using a transmission antenna; and reception circuitry that receives, by using a reception antenna, a reflected wave signal of the radar signal that is reflected at a target and estimates an arrival direction of the reflected wave signal, in which the reception circuitry calculates a first reception power in each of a predetermined number of beam directions by using the reflected wave signal in a first cell among a plurality of cells into which a region represented by at least one of a distance component and a Doppler frequency component is divided, calculates a second reception power based on reception powers of reception array antennae by using the reflected wave signal in a peripheral cell of the first cell among the plurality of cells, and determines whether or not a target is present in the first cell based on a comparison result between the first reception power and a first threshold value that is a value obtained by multiplying the second reception power by a first coefficient.

A target determination method according to one example of the present disclosure includes: transmitting a radar signal by using a transmission antenna; and receiving, by using a reception antenna, a reflected wave signal of the radar signal that is reflected at a target and estimating an arrival direction of the reflected wave signal, in which the method includes: calculating a first reception power in each of a predetermined number of beam directions by using the reflected wave signal in a first cell among a plurality of cells into which a region represented by at least one of a distance component and a Doppler frequency component is divided; calculating a second reception power based on reception powers of reception array antennae by using the reflected wave signal in a peripheral cell of the first cell among the plurality of cells; and determining whether or not a target is present in the first cell based on a comparison result between the first reception power and a first threshold value that is a value obtained by multiplying the second reception power by a first coefficient.

These comprehensive or specific aspects may be realized by a system, an apparatus, a method, an integrated circuit, a computer program, or a recording medium, and may be realized by any combination of the system, the apparatus, the method, the integrated circuit, the computer program, and the recording medium.

According to an aspect of the present disclosure, it is possible to estimate an arrival direction of a reflected wave with high efficiency in a radar apparatus.

Further advantages and effects in an aspect of the present disclosure will be apparent from the specification and the drawings. The advantages and/or the effects are provided by several embodiments and the features disclosed in the specification and the drawings, but all thereof are not necessarily provided to obtain one or more identical features.

DESCRIPTION OF EMBODIMENTS

Figure 1:
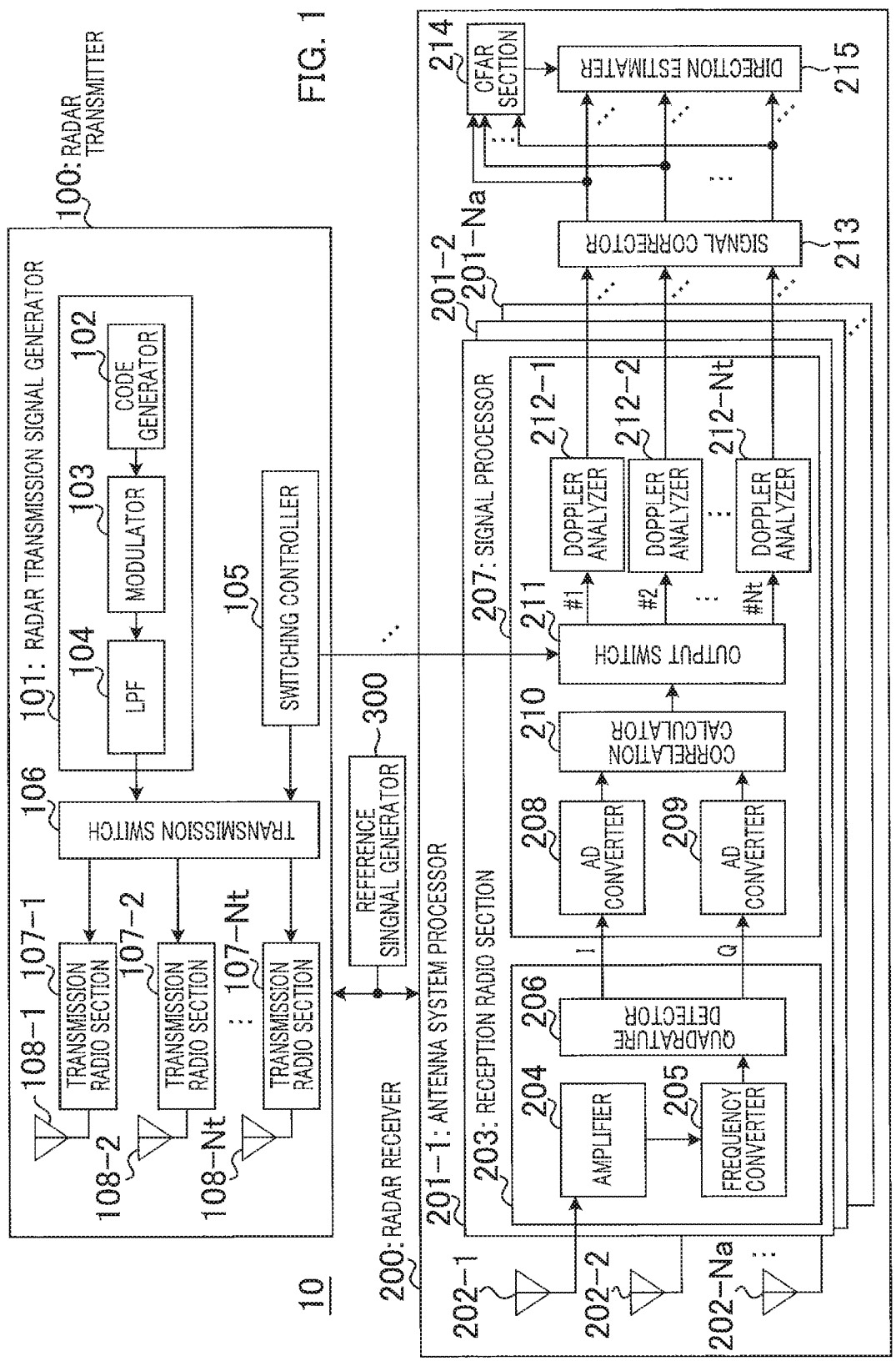
FIG. 1 is a block diagram illustrating a configuration example of a radar apparatus according to an embodiment.

Regarding a radar apparatus, there has been proposed a configuration (also referred to as a multiple input multiple output (MIMO) radar) in which a plurality of antennae (array antennae) are also provided on a transmission side in addition to a reception side, and beam scanning is performed through signal processes using the array antennae (for example, refer to NPL 2).

The MIMO radar transmits signals (radar transmitted waves) multiplexed by using, for example, time division, frequency division, or code division from a plurality of transmission antennae, receives signals (radar reflected waves) reflected at a peripheral object by using a plurality of reception antennae, and demultiplexes and receives the multiplexed transmission signals from the respective received signals. The MIMO radar can extract a complex propagation path response (received signals each including an amplitude component and a phase component) represented by a product of the number of transmission antennae and the number of reception antennae for each a distance component (range component) or a Doppler frequency component through the process, and performs an array signal process on the received signals as a virtual received array.

In the MIMO radar, an element interval in transmission/reception array antennae is appropriately disposed such that an antenna aperture can be virtually increased, and thus it is possible to improve an angle resolution.

As described above, the MIMO radar can configure a virtual reception array represented by the product of the number of transmission antennae and the number of reception antennae, and can thus obtain an array gain represented by the maximum number of transmission antennae and the maximum number of reception antennae as long as received signals including phase components can be coherently combined with each other.

However, in order to coherently combine the received signals of the virtual reception array in the MIMO radar, it is necessary to multiply the received signals by a directivity weight coefficient for directing a directional beam in an arrival direction of a radar reflected wave. In the MIMO radar, in a case where an arrival direction estimation process for retrieving a preferable directional weight coefficient is performed for each of all distance components or Doppler frequency components, a processing amount is enormous.

Therefore, for example, a target detection process such as in a constant false alarm rate (CFAR) process is used in which a threshold value is made adaptively variable such that a false alarm rate becomes constant, it is determined that there is a probability that a target may be present in a case where a distance component or a Doppler frequency component having a reception level greater than a threshold value, and it is determined that a target is not present in a case where a distance component or a Doppler frequency component having a reception level equal to or less than the threshold value. In a radar apparatus, for example, a target detection is performed through a CFAR process, an arrival direction estimation process is performed on only a distance component or a Doppler frequency component based on which a target may be detected to be present, and thus it is possible to reduce an amount of the arrival direction estimation process.

However, in a case where the CFAR process is applied prior to arrival direction estimation, the radar apparatus performs target detection through the CFAR process in a state of a signal to noise ratio (SNR) lower than an SNR in a case where an array gain is obtained through coherent combination. Thus, in a case where target detection using the CFAR process is applied prior to arrival direction estimation, when there is a distant target or a target having a small reflection sectional area, there is a problem in which a detection ratio for such a target deteriorates.

Regarding the problem, for example, PTL 1 discloses a method in which a radar apparatus multiplies array received signals by a directivity weight coefficient for directing a plurality of directional beams of which intervals in directional beam directions are rough, and a CFAR process is performed in each directional beam direction. In a case where there is a distant target or a target having a small reflectance sectional area in a direction in which a directional beam is directed, the radar apparatus performs the CFAR process in a state in which an SNR is improved by a directivity weight and can thus improve such a detection ratio.

However, the CFAR process disclosed in PTL 1 is a one-dimensional process for a distance component. In contrast, as disclosed in NPL 2, with respect to two-dimensional components such as a distance component and a Doppler frequency component, a processing amount of a process of making a threshold value adaptively variable by multiplying a directivity weight coefficient at a rough interval (for example, about ten directions) is enormous. Therefore, for example, in a case where a CFAR process is performed for each directional beam direction as disclosed in PTL 1 with respect to two-dimensional components such as a distance component and a Doppler frequency component, a larger processing amount is necessary.

Therefore, in one Example of the present disclosure, a description will be made of a target determination method (hereinafter, also referred to as a CFAR process) capable of improving a target detection ratio while suppressing an increase in a processing amount.

Hereinafter, an embodiment related to one Example of the present disclosure will be described in detail with reference to the drawings. In the embodiment, an identical constituent element will be given an identical reference numeral, and a repeated description will be omitted.

Hereinafter, a description will be made of a configuration in which, in a radar apparatus, different transmission signals that are time-division multiplexed are transmitted from a plurality of transmission antennae in a transmission branch, and each transmission signal is demultiplexed to be subjected to a reception process in a reception branch.

[Configuration of Radar Apparatus] FIG. 1 is a block diagram illustrating a configuration of radar apparatus 10 according to the present embodiment.

Radar apparatus 10 includes radar transmitter (transmission branch) 100, radar receiver (reception branch) 200, and reference signal generator 300.

Radar transmitter 100 generates a radio frequency radar signal (radar transmission signal) on the basis of a reference signal received from the reference signal generator 300. Radar transmitter 100 transmits the radar transmission signal in a predetermined transmission cycle by using transmission array antennae including a plurality of transmission antennae 108-1 to 108-Nt.

Radar receiver 200 receives a reflected wave signal that is the radar transmission signal reflected by a target (not illustrated) by using reception array antennae including a plurality of reception antennae 202-1 to 202-Na. Radar receiver 200 performs the following processing operation by using a reference signal received from reference signal generator 300, and thus performs a process synchronized with radar transmitter 100. Radar receiver 200 performs signal processes on a reflected wave signal received by each reception antenna 202, and thus, for example, detects the presence or absence of a target or estimates an arrival direction of the reflected wave signal.

A target is an object to be detected by radar apparatus 10, and includes, for example, a vehicle (including four-wheeled vehicle and a two-wheeled vehicle), a person, a block, or a curbstone.

Reference signal generator 300 is connected to radar transmitter 100 and radar receiver 200. Reference signal generator 300 supplies a reference signal to radar transmitter 100 and radar receiver 200, and thus synchronizes processes in radar transmitter 100 and radar receiver 200 with each other.

[Configuration of Radar Transmitter 100]

Radar transmitter 100 includes radar transmission signal generator 101, switching controller 105, transmission switch 106, transmission radio sections 107-1 to 107-Nt, and transmission antennae 108-1 to 108-Nt. In other words, radar transmitter 100 has Nt transmission antennae 108, and transmission antennae 108 are respectively connected to transmission radio sections 107.

Radar transmission signal generator 101 generates a timing clock by multiplying a reference signal received from reference signal generator 300 by a predetermined number, and generates a radar transmission signal on the basis of the generated timing clock. Radar transmission signal generator 101 repeatedly outputs a radar transmission signal in a predetermined radar transmission cycle (Tr). The radar transmission signal is expressed by $y(k,M)=I(k,M)+jQ(k,M)$. Here, j indicates an imaginary number unit, k indicates a discrete time, and M indicates an ordinal number of the radar transmission cycle. $I(k,M)$ and $Q(k,M)$ respectively indicate an in-phase component and a quadrature component of radar transmission signal $(k,M)$ at discrete time k in the M-th radar transmission cycle.

Radar transmission signal generator 101 includes code generator 102, modulator 103, and low pass filter (LPF) 104. Hereinafter, each constituent element of radar transmission signal generator 101 will be described.

Specifically, code generator 102 generates codes $a_n(M)$ (where n=1, . . . , and L) (pulse codes) of a code sequence with code length L in each radar transmission cycle Tr. As codes $a_n(M)$ generated in code generator 102, codes causing, for example, low range side lobe characteristics to be obtained are used. As the code sequence, for example, Barker codes, M-sequence codes, or Gold codes may be used.

Modulator 103 performs pulse modulation (amplitude modulation, amplitude shift keying (ASK), or pulse shift keying) or phase modulation (phase shift keying) on a pulse code sequence (for example, codes $a_n(M)$) received from code generator 102, and outputs a modulated signal to LPF 104.

LPF 104 outputs a signal component in a predetermined limited band or less in the modulated signal received from modulator 103, to transmission switch 106 as a baseband radar transmission signal.

Figure 2:
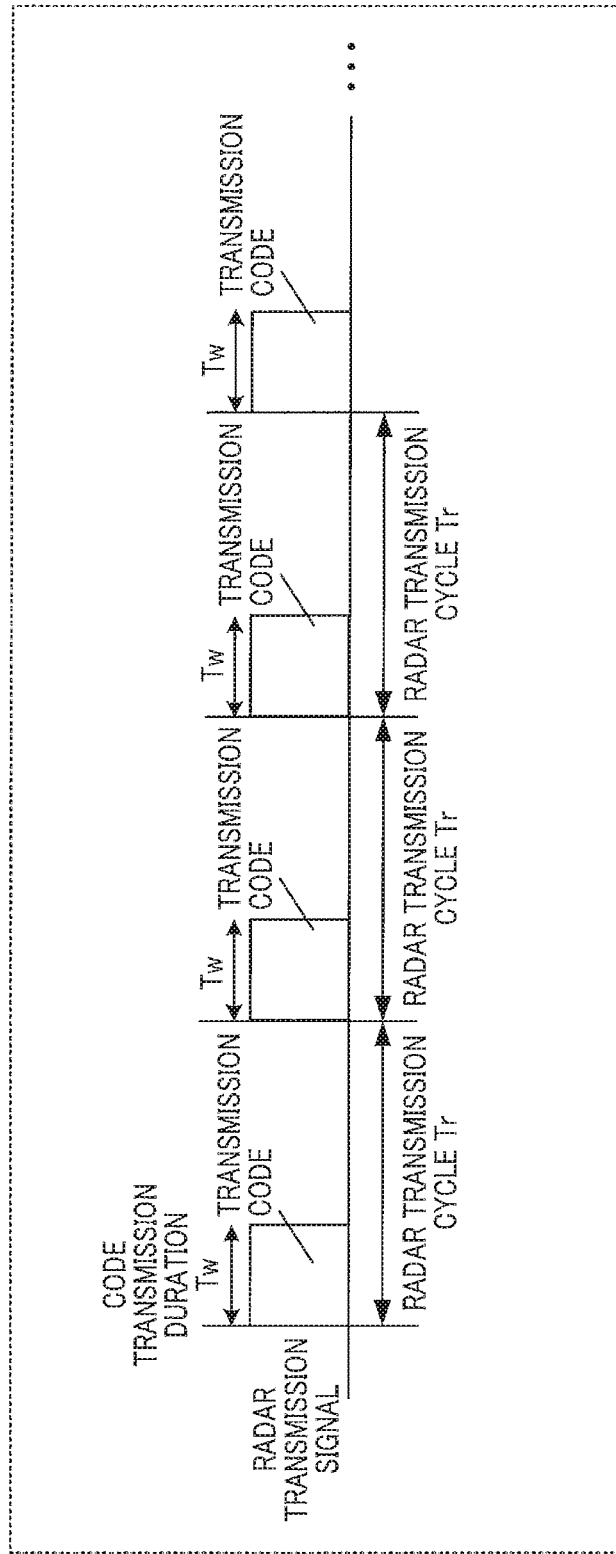
FIG. 2 is a diagram illustrating an example of a radar transmission signal according to the embodiment.

FIG. 2 illustrates an example of a radar transmission signal generated by radar transmission signal generator 101. As illustrated in FIG. 2, a pulse code sequence with code length L is included in code transmission duration Tw of radar transmission cycle Tr. The pulse code sequence is transmitted in code transmission duration Tw of each radar transmission cycle Tr, and remaining duration (Tr-Tw) is non-signal duration. A single code includes L sub-pulses. Pulse modulation using No samples is performed on each sub-pulse, and thus Nr (=No×L) sample signals are included in each code transmission duration Tw. Nu samples are included in non-signal duration (Tr-Tw) of radar transmission cycle Tr.

Switching controller 105 controls transmission switch 106 of radar transmitter 100 and output switch 211 of radar receiver 200. A control operation for output switch 211 of radar receiver 200 in switching controller 105 will be described later in a description of an operation of radar receiver 200. Hereinafter, a description will be made of a control operation for transmission switch 106 of radar transmitter 100 in switching controller 105.

Switching controller 105 outputs, to transmission switch 106, a control signal (hereinafter, referred to as a "switching control signal") for switching among transmission antennae 108 (in other words, transmission radio sections 107) in each radar transmission cycle Tr.

Transmission switch 106 performs a switching operation of outputting a radar transmission signal that is input from radar transmission signal generator 101 to transmission radio section 107 indicated by a switching control signal that is input from switching controller 105. For example, transmission switch 106 selects one from among the plurality of transmission radio sections 107-1 to 107-Nt and performs switching to the selected transmission radio section on the basis of the switching control signal, and outputs a radar transmission signal to the selected transmission radio section 107.

z-th (where z=1, . . . , and Nt) transmission radio section 107 performs frequency conversion on the baseband radar transmission signal output from transmission switch 106, thus generates a radar transmission signal in a carrier frequency (radio frequency (RF)), amplifies the radar transmission signal to have a predetermined transmission power P [dB] with a transmission amplifier, and outputs the radar transmission signal to z-th transmission antenna 108.

z-th (where z=1, . . . , and Nt) transmission antenna 108 radiates the radar transmission signal output from z-th transmission radio section 107 to the space.

Figure 3:
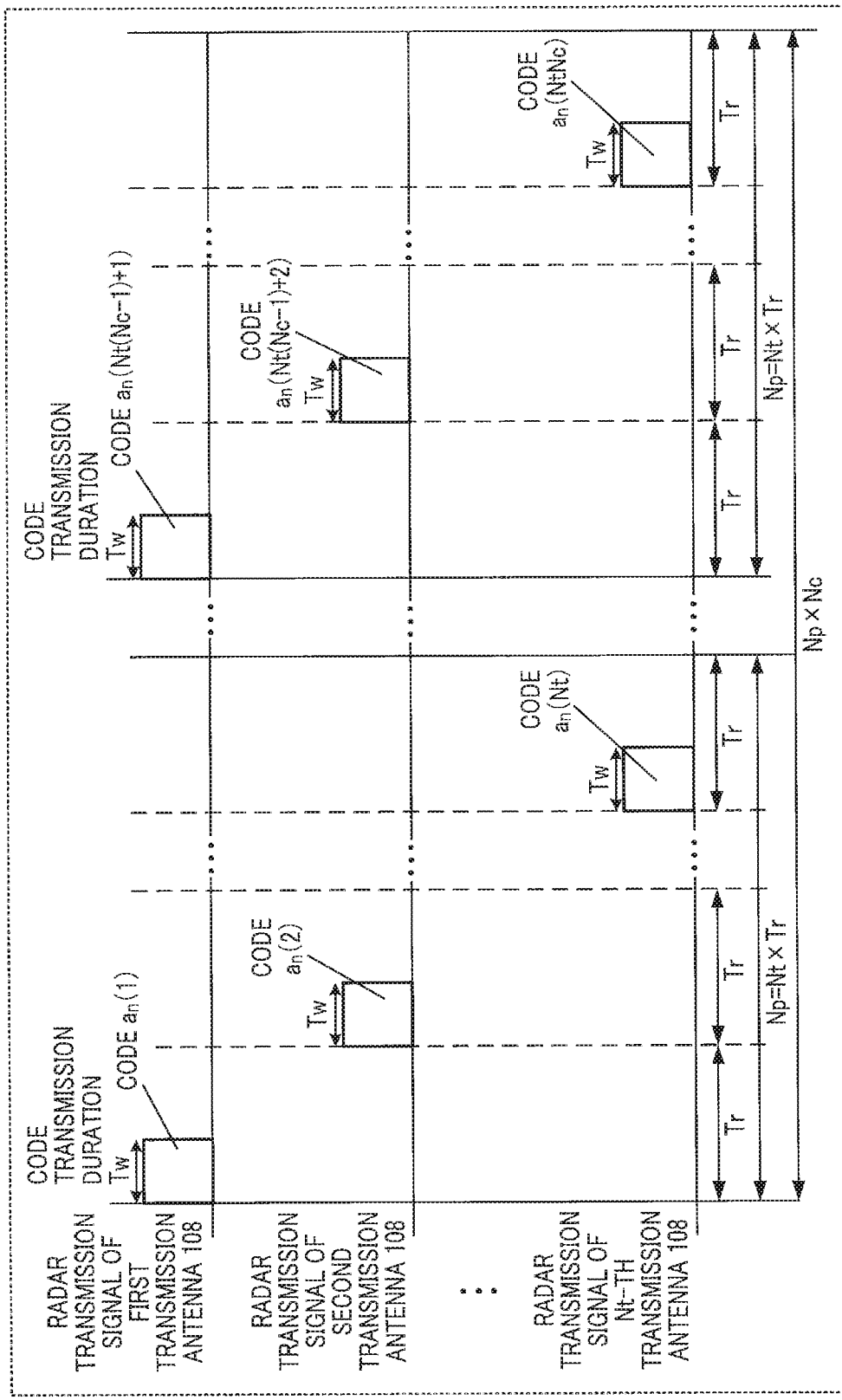
FIG. 3 is a diagram illustrating an example of a transmission switching operation according to the embodiment.

FIG. 3 illustrates an example of a switching operation of transmission antenna 108 according to the present embodiment.

In FIG. 3, switching controller 105 outputs a switching control signal indicating an instruction for sequentially switching from first transmission antenna 108 (or transmission radio section 107-1) to Nt-th transmission antenna 108 (or transmission radio section 107-Nt) to transmission switch 106 in each radar transmission cycle Tr. Therefore, radar transmission signals are respectively transmitted from transmission antennae including first transmission antenna 108 to Nt-th transmission antenna 108 at a transmission interval of the cycle of Np (=Nt×Tr).

Switching controller 105 performs control of repeating a switching operation of transmission radio section 107 Nc times in antenna switching cycle Np.

Figure 4:
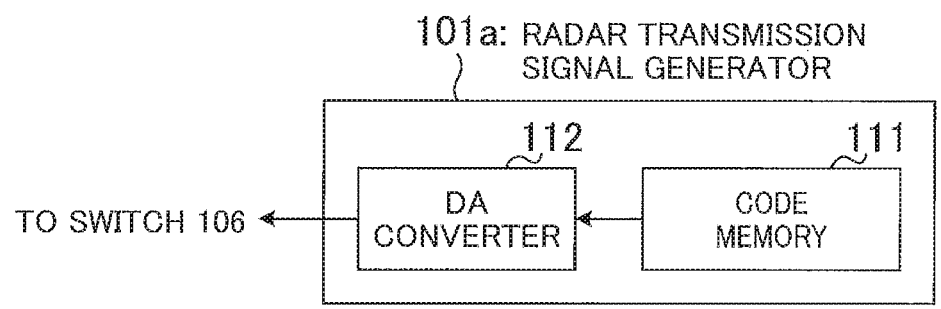
FIG. 4 is a block diagram illustrating another configuration example of a radar transmission signal generator according to the embodiment.

Radar transmitter 100 may include radar transmission signal generator 101a illustrated in FIG. 4 instead of radar transmission signal generator 101. Radar transmission signal generator 101a includes code memory 111 and DA converter 112 instead of code generator 102, modulator 103, and LPF 104 illustrated in FIG. 1. Code memory 111 stores in advance a code sequence generated in code generator 102 (FIG. 1), and cyclically and sequentially reads the stored code sequence. DA converter 112 converts the code sequence (digital signal) output from code memory 111 into an analog signal (baseband signal).

[Configuration of Radar Receiver 200]

In FIG. 1, radar receiver 200 includes Na reception antenna 202 to configure array antennae. Radar receiver 200 includes Na antenna system processors 201-1 to 201-Na, signal corrector 213, CFAR section 214, and direction estimator 215.

Each of reception antenna 202 receives a reflected wave signal that is a radar transmission signal reflected at a target, and outputs the received reflected wave signal to corresponding antenna system processor 201 as a received signal.

Each of antenna system processors 201 includes reception radio section 203 and signal processor 207.

Reception radio section 203 includes amplifier 204, frequency converter 205, and quadrature detector 206. Reception radio section 203 generates a timing clock obtained by multiplying a reference signal received from reference signal generator 300 by a predetermined number, and operates on the basis of the generated timing clock. Specifically, amplifier 204 amplifies a received signal that is received from reception antenna 202 to have a predetermined level, frequency converter 205 frequency-converts a received signal in a radio frequency band into a received signal in a baseband band, and quadrature detector 206 converts the received signal in the baseband band into baseband received signals including an I signal and a Q signal.

Signal processor 207 of each of antenna system processors 201-z (where z is any one of 1 to Na) includes AD converters 208 and 209, correlation calculator 210, output switch 211, and Doppler analyzers 212-1 to 212-Nt.

An I signal is input to AD converter 208 from quadrature detector 206, and a Q signal is input to AD converter 209 from quadrature detector 206. AD converter 208 performs sampling at a discrete time on a baseband signal including the I signal, and thus converts the I signal into digital data. AD converter 209 performs sampling at a discrete time on a baseband signal including the Q signal, and thus converts the Q signal into digital data.

Here, in sampling performed by AD converters 208 and 209, Ns discrete samples are generated per time Tp (=Tw/L) of a single sub-pulse in a radar transmission signal. In other words, the number of oversamples per sub-pulse is Ns.

In the following description, baseband received signals at discrete time k in M-th radar transmission cycle Tr[M] as outputs from AD converters 208 and 209 are represented by complex number signal $x_z(k,M)=I_z(k,M)+jQ_z(k,M)$ by using I signal $I_z(k,M)$ and Q signal $Q_z(k,M)$ (where z is any one of 1 to Na). Hereinafter, discrete time k uses a timing at which radar transmission cycle (Tr) starts as a reference (k=1), and signal processor 207 periodically operates up to $k=(Nr+Nu)Ns/No$ that is a sample point before radar transmission cycle Tr ends. In other words, k is 1, . . . , and (Nr+Nu)Ns/No. Here, j is an imaginary number unit.

Correlation calculator 210 of z-th (where z=1, . . . , and Na) signal processor 207 performs correlation calculation between discrete sample value $x_z(k,M)$ including discrete sample values $I_z(k,M)$ and $Q_z(k,M)$ received from AD converters 208 and 209 and pulse codes $a_n(M)$ (where z=1, . . . , and Na, and n=1, . . . , and L) with code length L transmitted from radar transmitter 100 in each radar transmission cycle Tr. For example, correlation calculator 210 performs sliding correlation calculation between discrete sample value $x_z(k,M)$ and pulse codes $a_n(M)$ in each radar transmission cycle Tr. For example, correlation calculation value $AC_z(k,M)$ obtained through the sliding correlation calculation at discrete time k in M-th radar transmission cycle Tr[M] is calculated on the basis of the following expression.

$$AC_z(k, M) = \sum_{n=1}^{L} x_z(k + N_s(n-1), M)a_n(M)^* \quad \text{(Expression 1)}$$

In the expression, the asterisk (*) indicates a complex conjugate operator.

Correlation calculator 210 performs correlation calculation over periods of k=1, . . . , and (Nr+Nu)Ns/No according to expression (1).

Figure 5:
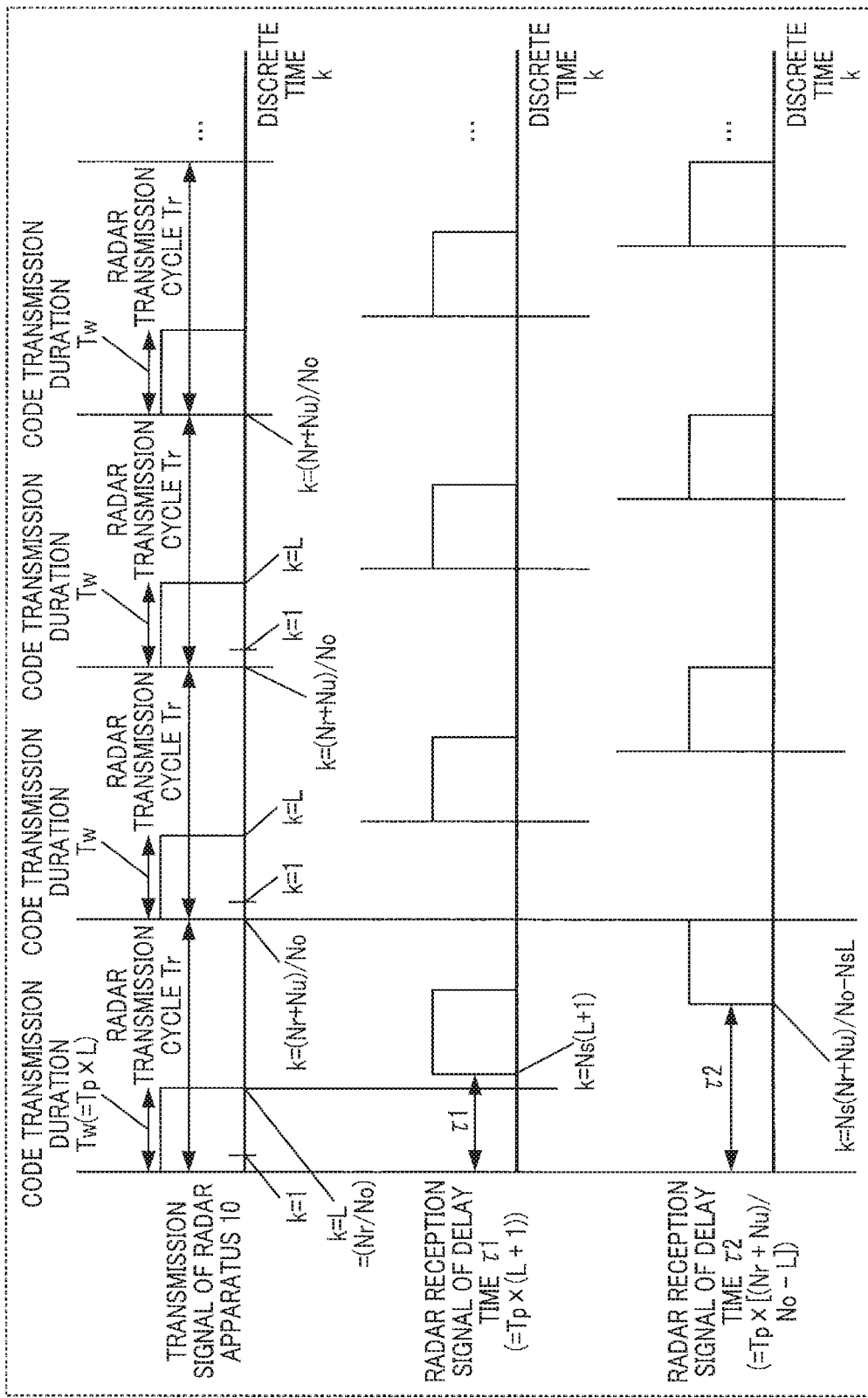
FIG. 5 is a diagram illustrating examples of a transmission timing of a radar transmission signal and a measurement range according to the embodiment.

Correlation calculator 210 is not limited to performing correlation calculation at k=1, . . . , and (Nr+Nu)Ns/No, and may restrict a measurement range (that is, a range of k) according to a range in which a target to be measured by radar apparatus 10 is present. Consequently, in radar apparatus 10, a calculation process amount of correlation calculator 210 can be reduced. For example, correlation calculator 210 may restrict a measurement range to k=Ns(L+1), . . . , and (Nr+Nu)Ns/No−NsL. In this case, as illustrated in FIG. 5, radar apparatus 10 does not perform measurement in duration corresponding to code transmission duration Tw.

Consequently, even in a case where a radar transmission signal directly sneaks to radar receiver 200, correlation calculator 210 does not perform a process in a period (at least a period less than at least τ1) in which the radar transmission signal is sneaking, and thus radar apparatus 10 can perform measurement excluding the influence of sneaking. In a case where a measurement range (a range of k) is restricted, a process in which the measurement range (the range of k) is restricted may also be applied to processes in output switch 211, Doppler analyzer 212, signal corrector 213, CFAR section 214, and direction estimator 215 described below. Consequently, a process amount in each constituent element can be reduced, and thus it is possible to reduce power consumption in radar receiver 200.

Output switch 211 selectively switches and outputs an output from correlation calculator 210 in each radar transmission cycle Tr to one of Nt Doppler analyzers 212 on the basis of a switching control signal that is input from switching controller 105. Hereinafter, as an example, a switching control signal in M-th radar transmission cycle Tr[M] is represented by Nt-bit information [bit$_1$(M), bit$_2$(M), . . . , and bit$_{Nt}$(M)]. For example, in a case where, in the switching control signal in M-th radar transmission cycle Tr[M], an ND-th bit (where ND is any one of 1 to Nt) is "1", output switch 211 selects ND-th Doppler analyzer 212 (that is, turns on Doppler analyzer 212). On the other hand, in a case where, in the switching control signal in M-th radar transmission cycle Tr[M], the ND-th bit is "0", output switch 211 non-selects ND-th Doppler analyzer 212 (that is, turns off Doppler analyzer 212). Output switch 211 outputs correlation calculation value $AC_z$(k,M) that is input from correlation calculator 210, to selected Doppler analyzer 212.

For example, an Nt-bit switching control signal corresponding to a switching operation for transmission radio sections 107 (or transmission antennae 108) illustrated in FIG. 3 is as follows.

[bit$_1$(1), bit$_2$(1), . . . , bit$_{Nt}$(1)]=[1, 0, . . . , 0]
[bit$_1$(2), bit$_2$(2), . . . , bit$_{Nt}$(2)]=[0, 1, . . . , 0]
. . .
[bit$_1$(Nt), bit$_2$(Nt), . . . , bit$_{Nt}$(Nt)]=[0, 0, . . . , 1]

As described above, respective Doppler analyzers 212 are sequentially selected (that is, turned on) in the cycle of Np (=Nt×Tr). The switching control signal repeats the content Nc times.

z-th (where z=1, . . . , and Na) signal processor 207 includes Nt Doppler analyzers 212.

Doppler analyzer 212 performs Doppler analysis on an output (for example, correlation calculation value $AC_z$(k, M)) from output switch 211 at each discrete time k.

For example, in a case where Nc is a power of 2, a fast Fourier transform (FFT) process may be applied in the Doppler analysis. For example, a w-th output from ND-th Doppler analyzer 212 of z-th signal processor 207 indicates a Doppler frequency response of Doppler frequency index $f_s$ at discrete time k as indicated by the following expression.

$$FT\_CI_z^{(ND)}(k, f_s, w) = \sum_{q=0}^{N_t N_c - 1} bit_{ND}(q+1) \, AC_z(k, N_t, N_c(w-1) + q + 1) \exp\left[-j\frac{2\pi \left\lfloor \frac{q}{N_t} \right\rfloor f_s}{N_c}\right]$$

(Expression 2)

In expression (2), ND is 1 to Nt, k is 1, . . . , and (Nr+Nu)Ns/No, and w is an integer of 1 or greater. In addition, j is an imaginary number unit, and z is 1 to Na. Nc is an FFT size, and a range of Doppler frequency index $f_s$ is $f_s$=−Nc/2+1, . . . , 0, . . . , and Nc/2.

During the FFT process, Doppler analyzer 212 may multiply a window function coefficient such as a Han window or a Hamming window. The window function coefficient is used, and thus it is possible to suppress side lobes generated around a frequency peak.

In the following description, w-th outputs $FT\_CI_z^{(1)}(k,f_s,w)$, $FT\_CI_z^{(2)}(k,f_s,w)$, . . . , and $FT\_CI_z^{(Nt)}(k,f_s,w)$ from Doppler analyzers 212, obtained by performing an identical process in Na antenna system processors 201 (signal processors 207) are represented as virtual reception array correlation vector $h(k,f_s,w)$ as in the following expression. Virtual reception array correlation vector $h(k,f_s,w)$ includes elements of Nt×Na that is a product of the number Nt of transmission antennae and the number Na of reception antennae. Virtual reception array correlation vector $h(k,f_s,w)$ is used for descriptions of a signal correction process in signal corrector 213, a peak detection process in CFAR section 214, and a direction estimation process in direction estimator 215, which will be described later. Here, z is 1, . . . , and Na, and ND is 1, . . . , and Nt.

$$h(k, f_s, w) = \begin{bmatrix} FT\_CI_1^{(1)}(k, f_s, w) \\ FT\_CI_2^{(1)}(k, f_s, w) \\ \vdots \\ FT\_CI_{Na}^{(1)}(k, f_s, w) \\ FT\_CI_1^{(2)}(k, f_s, w) \\ FT\_CI_2^{(2)}(k, f_s, w) \\ \vdots \\ FT\_CI_{Na}^{(2)}(k, f_s, w) \\ \vdots \\ FT\_CI_1^{(Nt)}(k, f_s, w) \\ FT\_CI_2^{(Nt)}(k, f_s, w) \\ \vdots \\ FT\_CI_{Na}^{(Nt)}(k, f_s, w) \end{bmatrix}$$

(Expression 3)

As mentioned above, the process in each constituent element of signal processor 207 has been described.

Signal corrector 213 performs deviation correction between the array antennae (for example, the transmission array antennae or the reception array antennae) and transmission phase correction due to time-division transmission on virtual reception array correlation vectors $h(k,f_s,w)$ of w-th Doppler analyzers 212, which are output from antenna system processors 201-1 to 201-Na. For example, signal corrector 213 multiplies virtual reception array correlation vector $h(k,f_s,w)$ by a correction coefficient as indicated by the following expression, and thus calculates corrected virtual reception array correlation vector $h_{aftercal}(k,f_s,w)$.

$$h_{aftercal}(k,f_s,w) = C_{VA} \circ C_{TX} \circ h(k,f_s,w)$$

(Expression 4)

In Expression (4), "∘" indicates the Hadamard product (that is, a product of respective vector elements). $C_{VA}$ indicates an array correction vector for deviation correction between the array antennae, and $C_{TX}$ indicates a transmission phase correction vector for transmission phase correction.

For example, array correction vector $C_{VA}$ is represented by elements of Na×Nt as in the following expression.

$$C_{VA} = [h_{ca[1][1]}, h_{ca[2][1]}, \ldots, h_{ca[Nd][1]}, h_{ca[1][2]}, \\ h_{ca[2][2]}, \ldots, h_{ca[Nd][2]}, \ldots, h_{ca[1][Nt]}, \\ h_{ca[2][Nt]}, \ldots, h_{ca[Nd][Nt]}]^T$$

(Expression 5)

In Expression (5), $h_{ca[z][ND]}$ indicates an array correction value for correcting phase deviation and amplitude deviation between ND-th transmission antennae 108 and between z-th reception antenna 202. The superscript "T" indicates vector transpose.

For example, transmission phase correction vector $C_{TX}$ is represented by elements of Na×Nt as in the following expression.

$$C_{TX} = [Txcal^{(1)}(f_s), \ldots, Txcal^{(1)}(f_s), Txcal^{(2)}(f_s), \ldots, Txcal^{(2)}(f_s), \ldots, Txcal^{(Nt)}(f_s), \ldots, Txcal^{(Nt)}(f_s)]^T \quad \text{(Expression 6)}$$

In Expression (6), $Txcal^{(1)}(f_s), \ldots,$ and $Txcal^{(Nt)}(f_s)$ are transmission phase correction coefficients for correcting phase rotation that depends on Doppler frequency index $f_s$ due to switching among transmission antennae 108 to in a time division manner and thus matching phases of the transmission antennae with a phase of a reference transmission antenna (for example, any one of Nt transmission antennae 108). Each $Txcal^{(ND)}(f_s)$ (where ND is any one of 1 to Nt) forms a vector repeated by the number Na of reception antenna 202. The superscript "T" indicates vector transpose. In a case where time-division transmission using a plurality of transmission antennae is not performed, the transmission phase correction coefficients are not necessary.

For example, first transmission antenna 108 (ND=1) is used as a reference transmission antenna in correspondence with a switching operation for transmission radio sections 107 (transmission antennae 108) illustrated in FIG. 3, the transmission phase correction coefficients are represented by the following expression.

$$TxCAL^{(1)}(f_s) = 1,$$

$$TxCAL^{(2)}(f_s) = \exp\left(-j\frac{2\pi f}{Nc}\frac{1}{Nt}\right),$$

$$TxCAL^{(Nt)}(f_s) = \exp\left(-j\frac{2\pi f}{Nc}\frac{Nt-1}{Nt}\right)$$

(Expression 7)

Next, a description will be made of an operation of CFAR section 214.

CFAR section 214 performs a CFAR process (that is, target detection using adaptive threshold value determination) by using corrected virtual reception array correlation vector $h_{aftercal}(k,f_s,w)$ that is input from signal corrector 213, and extracts index $k_{cfar}$ of discrete time and index $f_{s\_cfar}$ of a Doppler frequency providing a peak signal.

Figure 6:
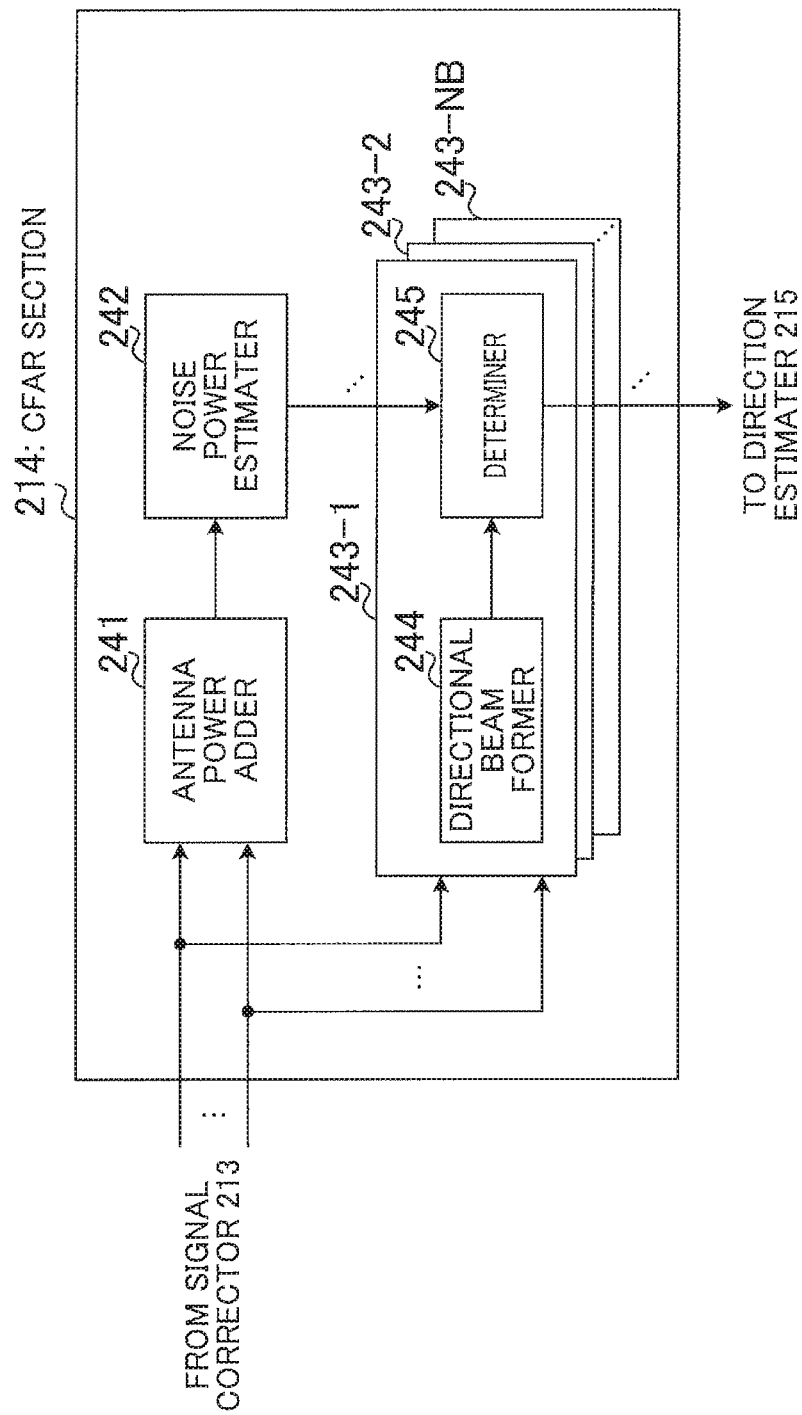
FIG. 6 is a block diagram illustrating an internal configuration example of a CFAR section according to the embodiment.

FIG. 6 is a block diagram illustrating an example of an internal configuration of CFAR section 214.

In FIG. 6, CFAR section 214 includes antenna power adder 241, noise power estimator 242, and detectors 243. CFAR section 214 includes NB detectors 243-$nb$ (beam index nb=1 to NB). NB indicates the number of beam directions formed in CFAR section 214.

Antenna power adder 241 adds a reception power in each virtual reception antenna, represented by elements of the corrected virtual reception array correlation vector by using w-th corrected virtual reception array correlation vector $h_{aftercal}(k,f_s,w)$ that is input from signal corrector 213. For example, virtual reception array power PowerFT($k,f_s,w$) obtained by adding a reception power in each virtual reception antenna is calculated according to the following expression.

$$\text{PowerFT}(k,f_s,w) = h_{aftercal}(k,f_s,w)^H h_{aftercal}(k,f_s,w) \quad \text{(Expression 8)}$$

Antenna power adder 241 outputs calculated virtual reception array power PowerFT($k,f_s,w$) to noise power estimator 242.

Noise power estimator 242 estimates noise power by using virtual reception array power PowerFT($k,f_s,w$) that is input from antenna power adder 241. For example, noise power estimator 242 calculates noise power estimation value PowerCL($k,f_s,w$) by using a two-dimensional CFAR window formed of a discrete time axis (corresponding to a distance) and a Doppler frequency axis (corresponding to a relative speed) or a combination of one-dimensional (for example, a cross shape on a discrete time axis and a Doppler frequency axis) CFAR windows. Details of a noise power estimation process using a two-dimensional CFAR window or a combination of one-dimensional CFAR windows are disclosed in, for example, NPL 3.

Hereinafter, a description will be made of an example of calculating noise power estimation value PowerCL($k,f_s,w$) in noise power estimator 242.

Figure 7:
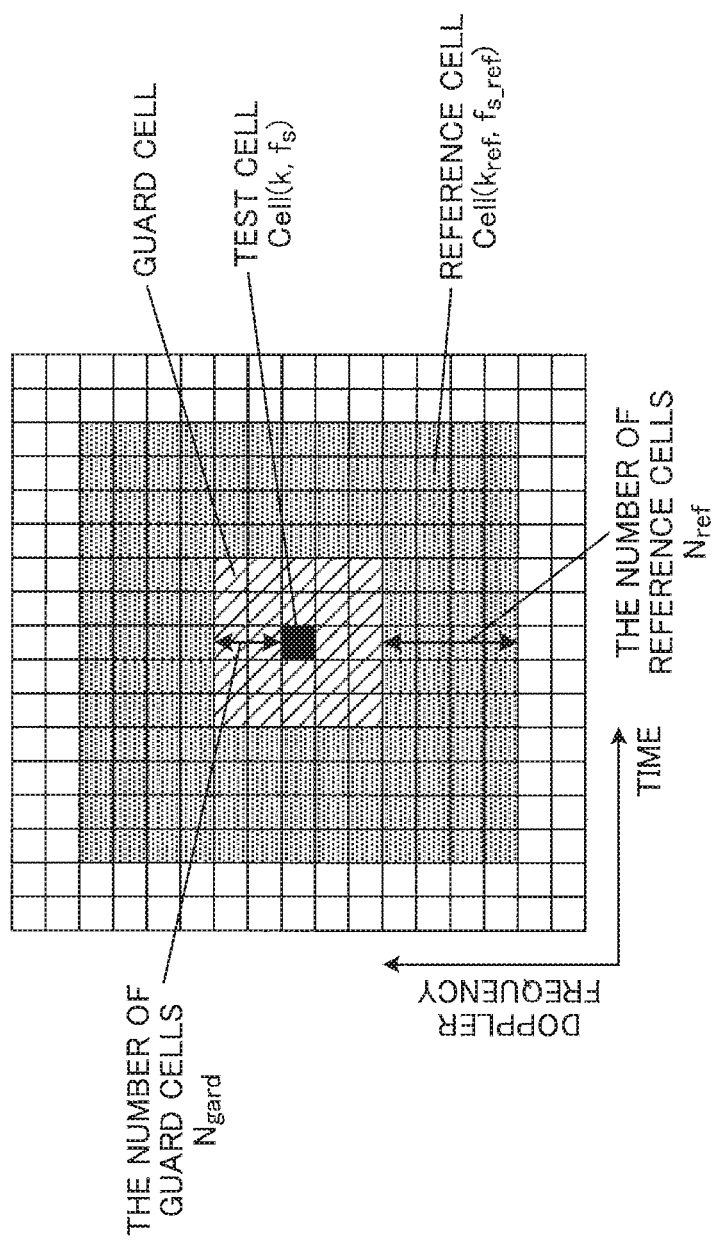
FIG. 7 is a diagram illustrating an example of a two-dimensional CFAR window.

Hereinafter, as an example, a description will be made of a noise power estimation process using a two-dimensional CFAR window. As illustrated in FIG. 7, a region represented by a time axis (distance component) and a Doppler frequency axis (Doppler frequency component) is illustrated to be divided into a plurality of cells. Hereinafter, an index of a two-dimensional cell represented by time index k and Doppler frequency index $f_s$ is indicated by Cell($k,f_s$)

As illustrated in FIG. 7, noise power estimator 242 performs noise power estimation on a cell (hereinafter, referred to as a "test cell" or a "cell of interest") Cell($k,f_s$) of which noise power estimation value PowerCL($k,f_s,w$) is calculated, by using virtual reception array power PowerFT($k,f_s,w$) of reference cell Cell($k_{ref},f_{s\_ref}$) excluding guard cells around test cell Cell($k,f_s$).

For example, in a case where the two-dimensional CFAR window illustrated in FIG. 7 is set for test cell Cell($k,f_s$), set "Ref_Cells" of time index $k_{ref}$ and Doppler frequency index $f_{s\_ref}$ included in reference cell Cell($k_{ref},f_{s\_ref}$) may be represented as in the following expression. Here, $N_{gard}$ is the number of guard cells, and $N_{ref}$ is the number of reference cells.

$$\begin{cases} \text{if } f_s - N_{gard} \leq f_{s\_ref} \leq f_s + N_{gard}, \\ k_{ref} \in \{k - N_{ref} - N_{gard}, \ldots, k - N_{gard} - 1, k + N_{gard} + 1, \ldots, k + N_{gard} + N_{ref}\} \\ \text{if } f_s + N_{gard} < f_{s\_ref} \leq f_s + N_{gard} + N_{ref} \text{ or } f_s - N_{gard} - N_{ref} \leq f_{s\_ref} < f_s - N_{gard} \\ k_{ref} \in \{k - N_{ref} - N_{gard}, \ldots, k + N_{ref} + N_{gard}\} \end{cases}$$

(Expression 9)

Each reference cell Cell($k_{ref},f_{s\_ref}$) stores virtual reception array power PowerFT($k_{ref},f_{s\_ref},w$). Noise power estimator 242 calculates a statistical value of virtual reception array power PowerFT($k_{ref},f_{s\_ref},w$) in reference cell Cell($k_{ref},f_{s\_ref}$), and uses the statistical value as noise power (noise power estimation value PowerCL($k,f_s,w$)). As the statistical value, there is, for example, average value cell averaging (CA), or ordered statistic (OS) using a rank when virtual reception array powers are arranged in order. For example, in a case of a rank is 0.5 in the OS, a statistical value is a median of virtual reception array power PowerFT($k_{ref},f_{s\_ref}$) in reference cell Cell($k_{ref},f_{s\_ref}$).

For example, in a case where an average value is used as a statistical value of reference cell Cell($k_{ref},f_{s\_ref}$), noise power estimation value PowerCL($k,f_s,w$) is represented by the following expression. Here, $N_{ref\_cells}$ indicates the number of elements included in reference cell Cell($k_{ref}, f_{s\_ref}$).

$$PowerCL(k, f_s, w) = \frac{\sum_{(k_{ref}, f_{s\_ref}) \in Ref\_cells} PowerFT(k_{ref}, f_{s\_ref}, w)}{N_{ref\_cell}} \quad \text{(Expression 10)}$$

As mentioned above, noise power estimator 242 calculates noise power estimation value PowerCL(k,$f_s$,w) on the basis of a reception power (that is, power addition value) of the virtual reception array antennae including antenna elements of the same number (Nt×Na) as a product of the number of transmission antennae 108 and the number of reception antenna 202 by using reflected wave signals in peripheral cells (herein, the reference cells) of the test cell among the plurality of cells.

As mentioned above, a description has been made of an example of calculating noise power estimation value PowerCL(k,$f_s$,w) in noise power estimator 242. In FIG. 7, a two-dimensional CFAR window has been used as an example, but the same may apply to a one-dimensional CFAR window. The two-dimensional CFAR window illustrated in FIG. 7 is only an example, and the number $N_{gard}$ of guard cells and the number $N_{ref}$ of reference cells may differ.

In FIG. 6, detector 243 detects peak signal discrete time index $k_{\_cfar}$ and Doppler frequency index $f_{s\_cfar}$ based on which a target may be present in NB beam directions by using corrected virtual reception array correlation vector $h_{aftercal}(k,f_s,w)$ that is input from signal corrector 213 and noise power estimation value PowerCL(k,$f_s$,w) that is input from noise power estimator 242.

For example, detector 243-$nb$ corresponding to nb-th beam direction (where nb is any one of 1 to NB) detects discrete time index $k_{\_cfar}$ and Doppler frequency index $f_{s\_cfar}$ providing a peak signal based on which a target may be present in an nb-th beam direction.

In FIG. 6, each detector 243 includes directional beam former 244 and determiner 245.

For example, in a specific cell (for example, the test cell illustrated in FIG. 7), directional beam former 244 of each detector 243 multiplies w-th corrected virtual reception array correlation vector $h_{aftercal}(k,f_s,w)$ by NB directivity weight vectors ($W_{BEAM}(\theta_{BEAM(1)})$, $W_{BEAM}(\theta_{BEAM(2)})$, ..., and $W_{BEAM}(\theta_{BEAM(NB)})$) with different beam directions, and thus calculates beam reception powers in respective beam directions ($\theta_{BEAM(1)}$, $\theta_{BEAM(2)}$, ..., and $\theta_{BEAM(NB)}$). Beam reception power PowerBeam($\theta_{BEAM(nb)}$, k,$f_s$,w) is calculated according to, for example, the following expression. Here, beam index nb is 1, ..., and NB.

$$PowerBeam(\theta_{BEAM(nb)}, k, f_s, w) = |W_{BEAM}(\theta_{BEAM(nb)})^H h_{aftercal}(k, f_s, w)|^2 \quad \text{(Expression 11)}$$

Figure 8:
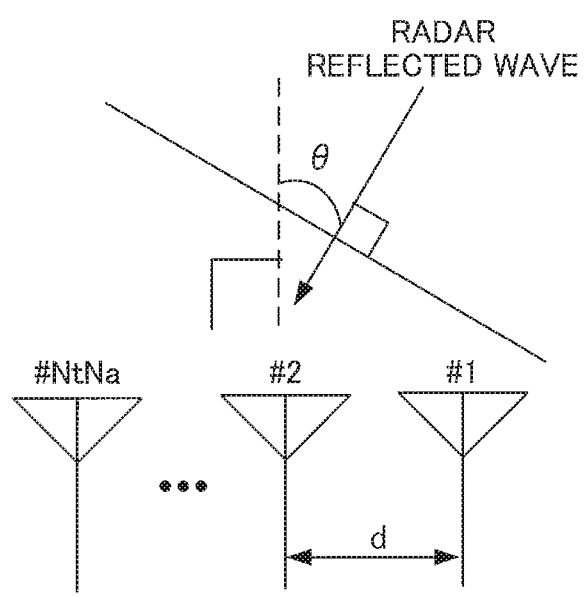
FIG. 8 is a diagram illustrating an example of a relationship between an array antenna disposition and an azimuthal direction.

Directional beam former 244 uses, for example, a Fourier beam for directivity weight vector $W_{BEAM}(\theta_{BEAM(nb)})$. In a case where the Fourier beam is used, directivity weight vector $W_{BEAM}(\theta_{BEAM(nb)})$ may be represented by a column by using complex responses of array antennae in a case where a radar reflected wave arrives from the direction of $\theta_{BEAM(nb)}$ as elements. For example, in a case where the number of elements of the virtual reception array antennae is Nt×Na, and the elements are linearly disposed at equal interval d as illustrated in FIG. 8, complex responses (that is, direction vectors) $W_{BEAM}(\theta_{BEAM(nb)})$ of ideal array antennae without phase deviation and amplitude deviation between the antennae are represented as in the following expression. Here, λ is a wavelength of a carrier frequency of an RF signal output from transmission radio section 107.

$$W_{BEAM}(\theta_{BEAM(nb)}) = \begin{bmatrix} 1 \\ \exp\left\{-\frac{j2\pi d}{\lambda}\sin\theta_{BEAM(nb)}\right\} \\ \vdots \\ \exp\left\{-\frac{j2\pi d(N_t N_a - 1)d}{\lambda}\sin\theta_{BEAM(nb)}\right\} \end{bmatrix} \quad \text{(Expression 12)}$$

As the Fourier beam, a beam based on space FFT may be used. In this case, instead of multiplying directivity weight vector $W_{BEAM}(\theta_{BEAM(nb)})$, directional beam former 244 performs space FFT with FFT size NB on corrected virtual reception array correlation vector $h_{aftercal}(k,f_s,w)$ in order to calculate a complex power value as a result of the space FFT on a complex value, and thus calculates beam reception power PowerBeam($\theta_{BEAM(nb)}$, k,$f_s$,w). Here, NB is assumed to be a power of 2. In a case where the number (Nt×Na) of elements of corrected virtual reception array correlation vector $h_{aftercal}(k,f_s,w)$ does not satisfy a power of 2, beam former 244 performs zero filling with an element not satisfying a power of 2 as zero, and performs the space FFT with FFT size NB.

In a case where elements of the virtual reception array antennae are disposed in a face form (for example, a rectangular shape) in a horizontal direction and a vertical direction at predetermined intervals, directional beam former 244 uses directivity weight vector $W_{BEAM}(\theta_{BEAM(nb)}, \Phi_{BEAM(nb)})$ having vertical direction $\theta_{BEAM(nb)}$ and horizontal direction $\Phi_{BEAM(nb)}$ as main beam directions. In this case, for example, a two-dimensional Fourier beam is applied as directivity weight vector $W_{BEAM}(\theta_{BEAM(nb)}, \Phi_{BEAM(nb)})$.

As mentioned above, directional beam former 244 uses a reflected wave signal in each (that is, a test cell) of a plurality of cells, and calculates beam reception power in each of a predetermined number of beam directions. Directional beam former 244 outputs calculated beam reception power PowerBeam($\theta_{BEAM(nb)}$, k,$f_s$,w) to determiner 245.

As represented in the following expression, determiner 245 compares a value (SF×PowerCL(k,$f_s$,w)) obtained by multiplying noise power estimation value PowerCL(k,$f_s$,w) that is input from noise power estimator 242 by a predetermined scale factor (SF) with beam reception power PowerBeam($\theta_{BEAM(nb)}$, k,$f_s$,w) that is input from directional beam former 244, for each of time index k and Doppler frequency index $f_s$ (that is, for each cell). Here, nb is 1, ..., and NB, and SF is greater than 0.

$$PowerBeam(\theta_{BEAM(nb)}, k, f_s, w) > SF \times PowerCL(k, f_s, w) \quad \text{(Expression 13)}$$

For example, determiner 245 sets each cell as a test cell in the plurality of cells illustrated in FIG. 7, and performs comparison determination represented in expression (13) for each cell.

For example, determiner 245 determines OK (that is, determines that there is a peak signal, and a target may be present) in a case where expression (13) is satisfied, and determines NG (that is, determines that there is no peak signal, and a target is not present) in a case where Expression (13) is not satisfied.

Determiner 245 outputs information indicating beam direction $\theta_{BEAM\_cfar}$, time index $k_{\_cfar}$, and Doppler frequency index $f_{s\_cfar}$ providing OK determination, to direction estimator 215. In other words, direction estimator 215 estimates an arrival direction with respect to a cell (for example, Cell($k_{\_cfar}, f_{s\_cfar}$)) in which beam reception power PowerBeam($\theta_{BEAM(nb)}, k, f_s, w$) in at least one of a predetermined number of beam directions is greater than a threshold value (($SF \times PowerCL(k, f_s, w)$)).

As mentioned above, CFAR section 214 uses beam reception power obtained by multiplying a directional beam (for example, a directivity weight vector) for a cell (that is, a test cell or a cell of interest) for target detection among two-dimensional components (cells) of distance components and Doppler frequency components, and can thus perform detection determination of a target (in other words, a peak signal) by improving an SNR. Therefore, CFAR section 214 can improve a detection ratio of, for example, a distant target or a target (weak reflection object) having a small reflectance sectional area.

CFAR section 214 calculates corrected virtual reception array correlation vector $h_{aftercal}(k, f_s, w)$ by using noise power estimation value PowerCL($k, f_s, w$) used for detection determination for each of a plurality of directional beams (NB directional beams in FIG. 6). In other words, CFAR section 214 does not calculate the noise polarized wave estimation value separately for each of the plurality of directional beams. Consequently, it is possible to reduce a calculation amount of a CFAR process in CFAR section 214.

Therefore, CFAR section 214 can improve a detection ratio of a target while reducing a calculation amount of a CFAR.

Noise power estimation value PowerCL($k, f_s, w$) calculated by using corrected virtual reception array correlation vector $h_{aftercal}(k, f_s, w)$ is not multiplied by directivity weight vector $W_{BEAM}(\theta_{BEAM(nb)})$. Thus, noise power estimation value PowerCL($k, f_s, w$) is smaller by inverse number times of the square (the square of the norm) ($W_{BEAM}(\theta_{BEAM(nb)})^H W_{BEAM}(\theta_{BEAM(nb)})$) of the magnitude of $W_{BEAM}(\theta_{BEAM(nb)})$ than in a case of performing noise power estimation separately for each directional beam.

Noise power estimation value PowerCL($k, f_s, w$) uses power addition of corrected virtual reception array correlation vector $h_{aftercal}(k, f_s, w)$, and thus does not have the influence to cancel out noise phase components. Consequently, in noise power estimation value PowerCL($k, f_s, w$), power of a white noise component is estimated about $(Na \times Nt)^{1/2}$ times higher on average than in a case of performing noise power estimation separately for each directional beam.

When the above contents are taken into consideration, noise power estimation value PowerCL($k, f_s, w$) calculated by using corrected virtual reception array correlation vector $h_{aftercal}(k, f_s, w)$ has a difference of about $\Delta_{Power}$ times indicated by the following expression on average without depending on test cell Cell($k, f_s$) from a case of performing noise power estimation separately for each directional beam. Therefore, the difference between the case of using noise power estimation value PowerCL($k, f_s, w$) and the case of performing noise power estimation separately for each directional beam is absorbed by adjusting a level of a scale factor, and thus notable deterioration in a target detection ratio does not occur.

$$\Delta_{Power} = \frac{\sqrt{N_t N_a}}{W_{BEAM}(\theta_{BEAM(nb)})^H W_{BEAM}(\theta_{BEAM(nb)})} \quad \text{(Expression 14)}$$

CFAR section 214 may set, for example, scale factor SF in Expression (13) to about $SF_C \times \Delta_{Power}$ with respect to scale factor $SF_C$ in a case where noise power estimation is performed separately for each directional beam. Consequently, CFAR section 214 can absorb the difference (an increase in noise component power, for example, refer to expression (14)) from the case of performing nose power estimation separately for each directional beam, and thus notable deterioration in a target detection ratio does not occur.

As mentioned above, an operation of CFAR section 214 has been described.

Next, a description will be made of an operation of direction estimator 215 illustrated in FIG. 1.

Direction estimator 215 extracts corrected virtual reception array correlation vector $h_{aftercal}(k_{\_cfar}, f_{s\_cfar}, w)$ from corrected virtual reception array correlation vector $h_{aftercal}(k, f_s, w)$ that is input from signal corrector 213 on the basis of information (for example, beam direction $\theta_{BEA\_cfar}$, time index $k_{\_cfar}$, and Doppler frequency index $f_{s\_cfar}$ determined as being OK) that is input from CFAR section 214. Direction estimator 215 performs a direction estimation process as follows by using extracted corrected virtual reception array correlation vector $h_{aftercal}(k_{\_cfar}, f_{s\_cfar}, w)$.

Direction estimator 215 calculates, for example, a space profile by making azimuthal direction $\theta$ in direction estimation evaluation function value $P_H(\theta_{BEAM\_cfar}, k_{\_cfar}, f_{s\_cfar}, w)$ variable within a predetermined angle range, extracts a predetermined number of maximum peaks of the calculated space profile in a descending order, and outputs azimuthal directions of the maximum peaks as arrival direction estimation values.

Direction estimation evaluation function value $P_H(\theta_{BEAM\_cfar}, k_{\_cfar}, f_{s\_cfar}, w)$ is obtained in various methods according to an arrival direction estimation algorithm. For example, an estimation method using array antennae disclosed in NPL 1 may be used.

For example, in a case where Nt×Na virtual reception arrays are linearly disposed at equal interval $d_H$, a beam former method may be represented by the following expression. Methods such as Capon or MUSIC may also be applied.

$$P_H(\theta_u, k_{cfar}, f_{s\_cfar}, w) = |a^H(\theta_u) h_{aftercal}(k_{cfar}, f_{s\_cfar}, w)|^2 \quad \text{(Expression 15)}$$

$$a(\theta_u) = \begin{bmatrix} 1 \\ \exp\{-j2\pi d_H \sin\theta_u/\lambda\} \\ \vdots \\ \exp\{-j2\pi(N_t N_a - 1)d_H \sin\theta_u/\lambda\} \end{bmatrix} \quad \text{(Expression 16)}$$

Here, the superscript H in expression (15) is an Hermitian transpose operator. In addition, $a(\theta_u)$ indicates a direction vector of a virtual reception array for an arrival wave in azimuthal direction $\theta_u$.

Azimuthal direction $\theta_u$ is a vector obtained by changing an azimuth range subjected to arrival direction estimation at predetermined azimuth interval $\beta_1$. For example, $\theta_u$ is set as follows. $\theta_u = \theta\min + u\beta_1$, and $u = 0, \ldots,$ and NU $NU = \text{floor}[(\theta\max - \theta\min)/\beta_1] + 1$ Here, floor(x) is a function that returns the maximum integer value not exceeding real number x.

Direction estimator 215 may restrict a range of an angular direction on the basis of beam direction $\theta_{BEAM\_cfar}$ that is input from CFAR section 214. For example, direction estimator 215 may calculate direction estimation evaluation function value $P_H(\theta_{BEAM\_cfar}, k_{\_cfar}, f_{s\_cfar}, w)$ in a range $(\theta_{BEAM\_cfar} - \Delta_L \leq \theta_u \leq \theta_{BEAM\_cfar} + \Delta_L)$ corresponding to predetermined range $\Delta_L$ with respect to beam direction $\theta_{BEAM\_cfar}$, and may detect a peak direction.

In other words, in an arrival direction estimation process on a cell corresponding to time index $k_{\_cfar}$ and Doppler frequency index $f_{s\_cfar}$, direction estimator 215 estimates an arrival direction in a range set with beam direction $\theta_{BEAM\_cfar}$ (that is, a beam direction in which a beam reception power is greater than a threshold value) as a reference. Consequently, it is possible to reduce a calculation amount regarding a peak direction detection process.

In a case where the virtual reception arrays are disposed in a face form (for example, a rectangular shape) in a horizontal direction and a vertical direction, direction estimator 215 may also perform direction estimation including the vertical direction in addition to horizontal direction θ. In this case, direction estimator 215 may perform two-dimensional direction estimation including the vertical direction and the horizontal direction.

Time information $k_{\_cfar}$ may be converted into distance information that is then output. The following expression may be used to convert time information $k_{\_cfar}$ into distance information $R(k_{\_cfar})$. Here, Tw indicates code transmission duration, L indicates a pulse code length, and $C_0$ indicates a light speed.

$$R(k_{\_cfar}) = k_{\_cfar} \frac{T_w C_0}{2L} \quad \text{(Expression 17)}$$

The Doppler frequency information may be converted into a relative speed component that is then output. The following expression may be used to convert Doppler frequency index $f_{s\_cfar}$ into relative speed component $v_d(f_{s\_cfar})$. Here, λ is a wavelength of a carrier frequency of an RF signal output from transmission radio section 107. $\Delta_f$ is a Doppler frequency interval in an FFT process performed by Doppler analyzer 212. For example, in the present embodiment, $\Delta_f$ is 1/(NtNcTr).

$$v_d(f_{s\_cfar}) = \frac{\lambda}{2} f_{s\_cfar} \Delta_f \quad \text{(Expression 18)}$$

As mentioned above, a description has been made of an operation of direction estimator 215.

As mentioned above, in CFAR section 214, directional beam former 244 calculates a first reception power (for example, beam reception power) in each of a predetermined number of beam directions by using a reflected wave signal in a first cell (for example, a test cell) among a plurality of cells into which a region indicated by at least one of a distance component and a Doppler frequency component is divided. Noise power estimator 242 calculates a second reception power (for example, an average value of reception powers of the reception array antennae or a rank when the reception powers of the reception array antennae are arranged in order) on the basis of the reception powers of the reception array antennae including elements of the same number as a product of the number of transmission antennae 108 and the number of reception antenna 202 by using reflected wave signals in peripheral cells (for example, reference cells) of the first cell among the plurality of cells. Determiner 245 performs determination (target detection determination) of whether or not a target is present in the first cell on the basis of a comparison result between the first reception power and a first threshold value obtained by multiplying the second reception power by a first coefficient, and direction estimator 215 subsequent thereto determines whether or not an arrival direction is to be estimated.

Consequently, radar apparatus 10 can use a beam reception power after directional beam multiplication, improve an SNR, and perform target detection determination, and can thus achieve an effect of improving a detection ratio of a distant target or a target (weak reflection object) having a small reflection sectional area. The noise power estimation value is not multiplied by a directional beam, and is calculated on the basis of virtual reception array power PowerFT $(k, f_s, w)$, and thus it is possible to reduce a calculation amount. Therefore, it is possible to improve a target detection ratio while suppressing an increase in a processing amount.

Therefore, according to the present embodiment, radar apparatus 10 can estimate an arrival direction of a reflected wave with high efficiency.

Variation 1 of One Embodiment

Figure 9:
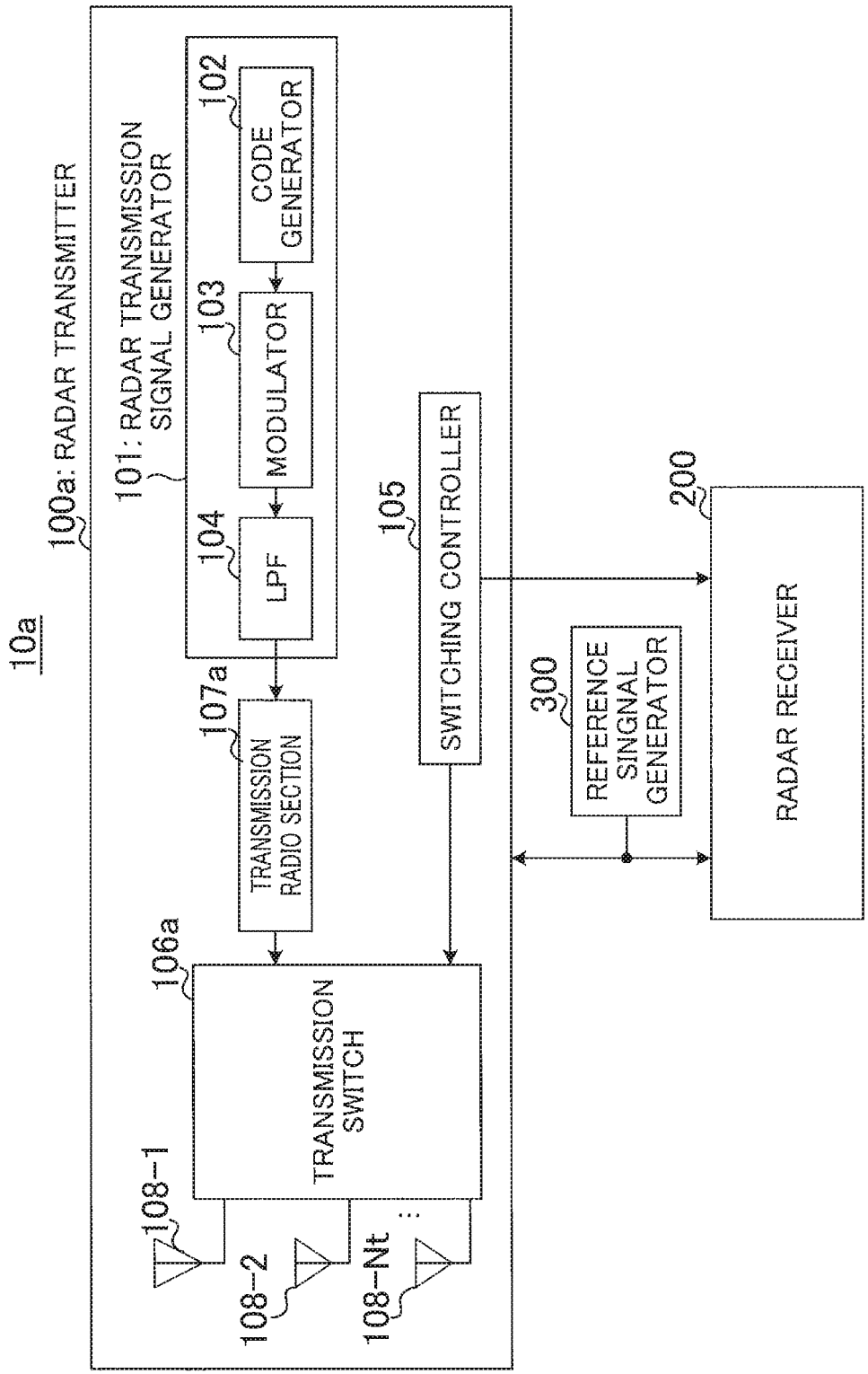
FIG. 9 is a block diagram illustrating a configuration example of a radar apparatus according to Variation 1.

A configuration of a radar apparatus according to an aspect of the present disclosure is not limited to the configuration illustrated in FIG. 1. For example, a configuration of radar apparatus 10a illustrated in FIG. 9 may be used. In FIG. 9, a configuration of radar receiver 200 is the same as the configuration illustrated in FIG. 1, and thus a detailed configuration is not illustrated.

In radar apparatus 10 illustrated in FIG. 1, transmission switch 106 of radar transmitter 100 selectively switches an output from radar transmission signal generator 101 to any one of the plurality of transmission radio sections 107. In contrast, in radar apparatus 10a illustrated in FIG. 9, in radar transmitter 100a, an output (radar transmission signal) from radar transmission signal generator 101 is subjected to a transmission radio process by transmission radio section 107a, and then an output from transmission radio section 107a is selectively switched to any one of a plurality of transmission antennae 108 by transmission switch 106a.

The configuration of radar apparatus 10a illustrated in FIG. 9 can also achieve the same effect as that of the embodiment.

Variation 2 of One Embodiment

In the embodiment, in radar transmitter 100, a description has been made of a case using a pulse compression radar that performs phase modulation or amplitude modulation on a pulse train and then transmits the pulse train, but a modulation method is not limited thereto. For example, the present disclosure is also applicable to a radar method using a pulse wave such as a chirp pulse subjected to frequency modulation.

Figure 10:
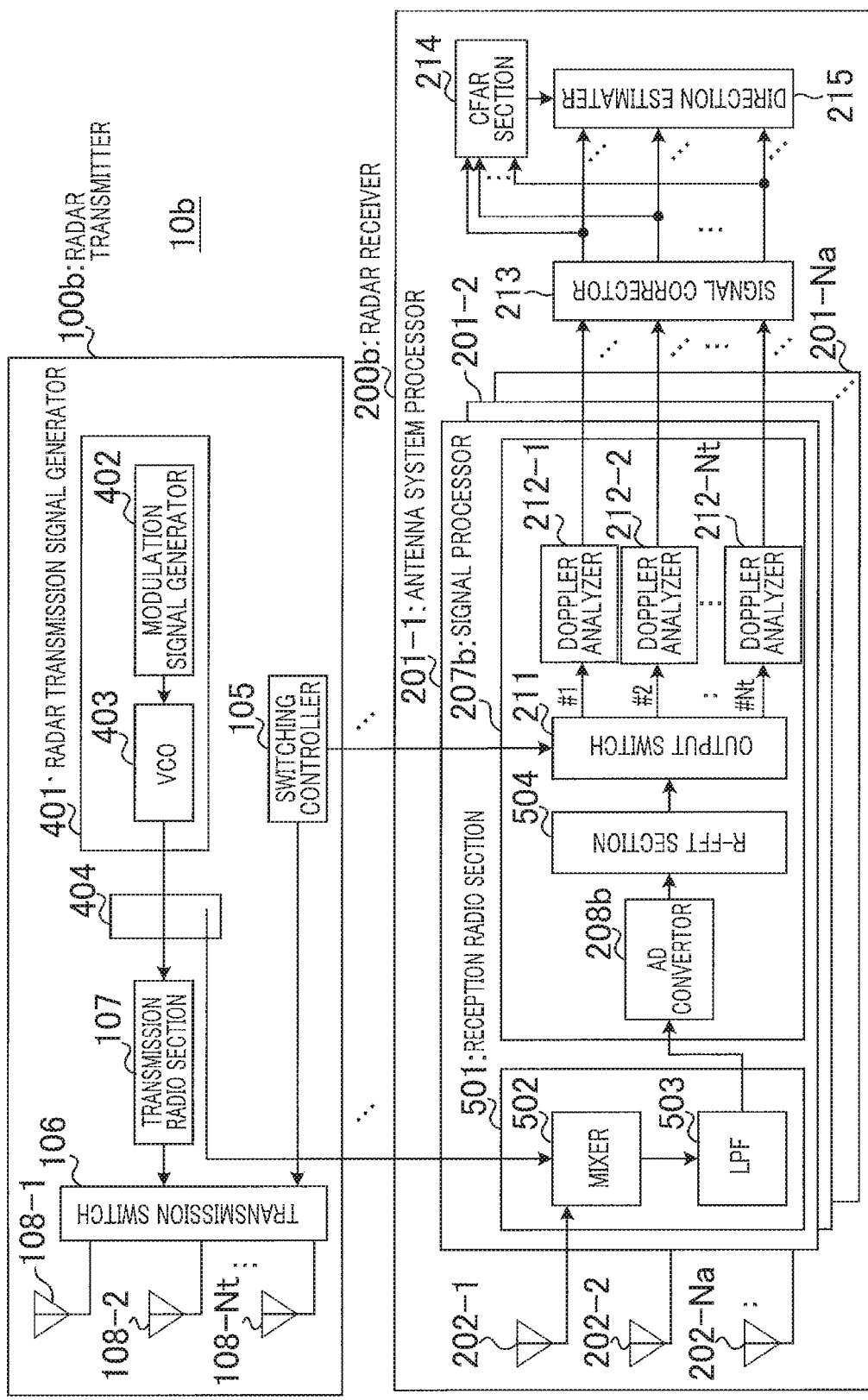
FIG. 10 is a block diagram illustrating a configuration example of a radar apparatus according to Variation 2.

FIG. 10 is a diagram illustrating an example of a configuration of radar apparatus 10b in a case where a radar method using chirp pulse (for example, fast chirp modulation) is applied. In FIG. 10, the same constituent element as in FIG. 1 will be given an identical reference numeral, and a description thereof will be omitted.

First, a description will be made of a transmission process in radar transmitter 100b.

In radar transmitter 100b, radar transmission signal generator 401 includes modulated signal generator 402 and voltage controlled oscillator (VCO) 403.

Figure 11:
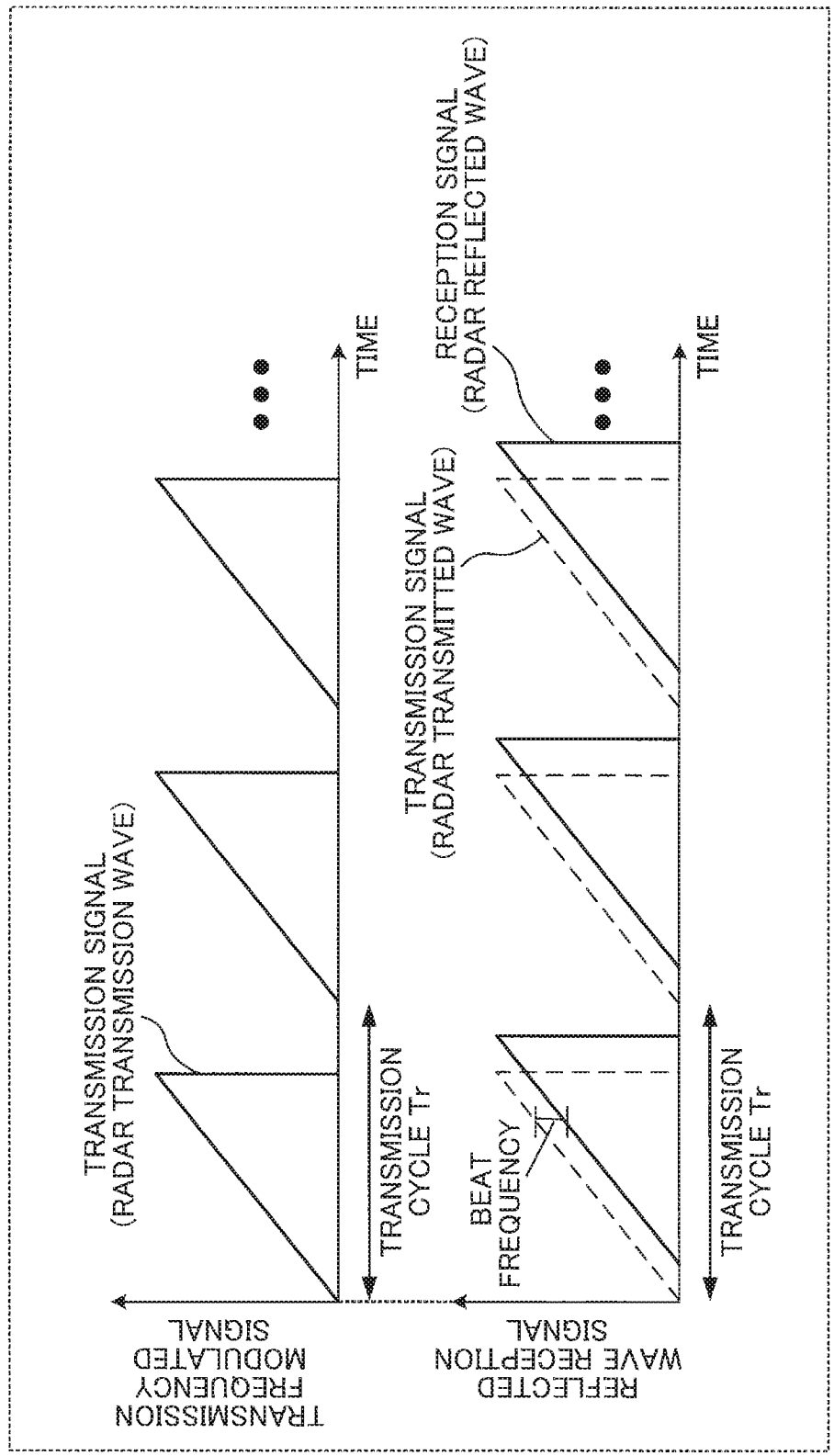
FIG. 11 is a diagram illustrating examples of a transmission signal and a reflected wave signal in a case where a chirp pulse is used.

Modulated signal generator 402 periodically generates, for example, a modulated signal having a saw tooth shape as illustrated in FIG. 11. Here, a radar transmission cycle is indicated by Tr.

VCO 403 outputs a frequency modulated signal (that is, a frequency chirp signal) to transmission radio section 107 on the basis of a radar transmission signal output from modulated signal generator 402. The frequency modulated signal is amplified in transmission radio section 107, and is radiated to the space from transmission antenna 108 to which switching is performed by transmission switch 106. For example, radar transmission signals are respectively transmitted from transmission antennae including first transmission antenna 108 to Nt-th transmission antenna 108 at a transmission interval of the cycle of Np (=Nt×Tr).

Directional coupler 404 extracts some of the frequency modulated signals, and outputs the extracted frequency modulated signals to respective reception radio sections 501 (mixers 502) of radar receiver 200b.

Next, a description will be made of a reception process in radar receiver 200b.

In reception radio section 501 of radar receiver 200b, mixer 502 mixes a received reflected wave signal with the frequency modulated signal (a signal that is input from directional coupler 404) that is a transmission signal, and causes a resultant signal to pass through LPF 503. Consequently, a bit signal having a frequency corresponding to a delay time of the reflected wave signal is extracted. For example, as illustrated in FIG. 11, a difference frequency between a frequency of the transmission signal (transmission frequency modulated wave) and a frequency of the received signal (reception frequency modulated wave) may be obtained as a beat frequency.

A signal output from LPF 503 is converted into discrete sample data by A/D converter 208b in signal processor 207b.

R-FFT section 504 performs an FFT process on Neta pieces of discrete sample data obtained in a predetermined time range (range gate) in each transmission cycle Tr. Consequently, signal processor 207b outputs a frequency spectrum in which a peak appears in the beat frequency corresponding to the delay time of the reflected wave signal (radar reflected wave). During the FFT process, R-FFT section 504 may multiply a window function coefficient such as a Han window or a Hamming window. The window function coefficient is used, and thus it is possible to suppress side lobes generated around a beat frequency peak.

Here, a beat frequency spectrum response output from R-FFT section 504 of z-th signal processor 207b, obtained due to M-th chirp pulse transmission, is indicated by AC_RFT$_z$(fb, M). Here, fb is an index number (bin number) of FFI; and is fb=0, . . . , and N$_{data}$/2. Smaller frequency index fb indicates a beat frequency at which a delay time of a reflected wave signal becomes shorter (that is, a distance from a target becomes shorter).

Output switch 211 of z-th signal processor 207b selectively switches an output from R-FFT section 504 in each radar transmission cycle Tr to one of Nt Doppler analyzers 212, and outputs the output to the selected Doppler analyzer, on the basis of a switching control signal that is input from switching controller 105, in the same manner as in the embodiment.

Hereinafter, as an example, a switching control signal in M-th radar transmission cycle Tr[M] is represented by Nt-bit information [bit$_1$(M), bit$_2$(M), . . . , and bit$_{Nt}$(M)]. For example, in a case where, in the switching control signal in M-th radar transmission cycle Tr[M], ND-th bit bit$_{ND}$(M) (where ND is any one of 1 to Nt) is "1", output switch 211 selects ND-th Doppler analyzer 212 (that is, turns on Doppler analyzer 212). On the other hand, in a case where, in the switching control signal in M-th radar transmission cycle Tr[M], the ND-th bit bit$_{ND}$(M) is "0", output switch 211 non-selects ND-th Doppler analyzer 212 (that is, turns off Doppler analyzer 212). Output switch 211 outputs a signal that is input from R-FFT section 504, to selected Doppler analyzer 212.

As described above, respective Doppler analyzers 212 are sequentially turned on in the cycle of Np (=Nt×Tr). The switching control signal repeats the content Nc times.

z-th (where z=1, . . . , and Na) signal processor 207b includes Nt Doppler analyzers 212.

Doppler analyzer 212 performs Doppler analysis on an output from output switch 211 for each beat frequency index fb.

For example, in a case where Nc is a power of 2, a fast Fourier transform (FFT) process may be applied in the Doppler analysis. For example, a w-th output from ND Doppler analyzer 212 of z-th signal processor 207b indicates a Doppler frequency response of Doppler frequency index fs at beat frequency index fb as indicated by the following expression.

$$\mathrm{FT\_CI}_z^{(ND)}(fb, f_s, w) = \sum_{q=0}^{N_t N_c - 1} bit_{ND}(q+1) \mathrm{AC\_RFT}_z$$

$$(fb, N_t N_c (w-1) + q + 1) \exp\left[-j \frac{2\pi \left\lfloor \frac{q}{N_t} \right\rfloor f_s}{N_c}\right]$$

(Expression 19)

In expression (19), ND is 1 to Nt, and w is an integer of 1 or greater. In addition, j is an imaginary number unit, and z is 1 to Na. Nc is an FFT size, and a range of Doppler frequency index fs is fs=−Nc/2+1, . . . , 0, . . . , and Nc/2.

Processes in signal corrector 213, CFAR section 214, and direction estimator 215 in the stages subsequent to signal processor 207b correspond to operations in which discrete time k described in the embodiment is replaced with beat frequency index fb, and thus detailed description thereof will be omitted.

Through the configurations and the operations, the present variation can also achieve the same effect as that of the embodiment. A frequency chirp signal may be similarly applied as a radar transmission signal in a variation of one embodiment which will be described later, and thus the same effect as in a case of using a coded pulse signal can be achieved.

Beat frequency index fb may be converted into distance information that is then output. The following expression may be used to convert beat frequency index fb into distance information R(fb). Here, Bw indicates a frequency modulation bandwidth of a frequency chirp signal generated through frequency modulation, and C$_0$ indicates a light speed.

$$R(fb) = \frac{C_0}{2B_w} f_b$$

(Expression 20)

Variation 3 of One Embodiment

In Variation 3, a CFAR process is different from that in the embodiment.

Figure 12:
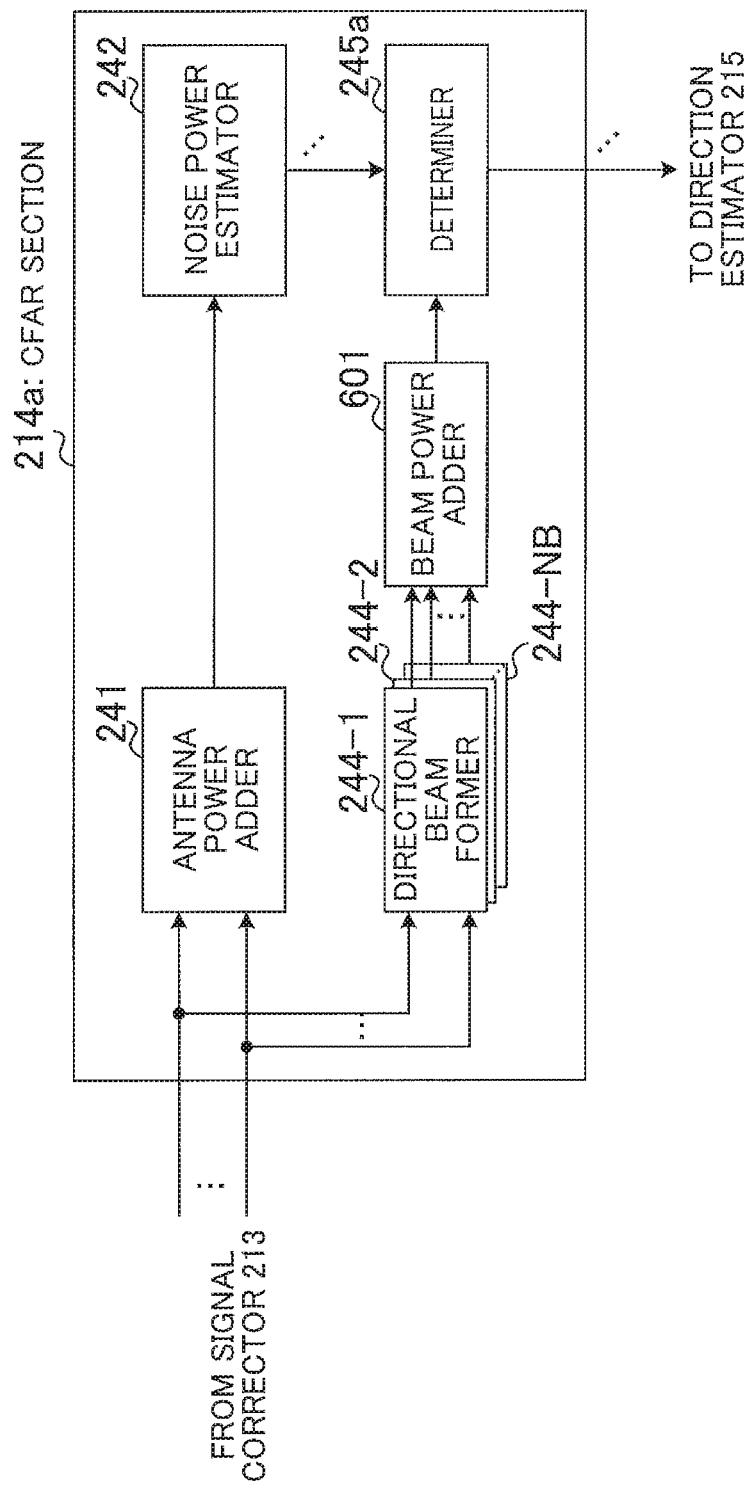
FIG. 12 is a block diagram illustrating an internal configuration example of a CFAR section according to Variation 3.

FIG. 12 is a block diagram illustrating a configuration example of CFAR section 214a according to Variation 3. In FIG. 12, the same constituent element as in FIG. 6 will be given an identical reference numeral, and a description thereof will be omitted.

Specifically, in CFAR section 214a illustrated in FIG. 12, operations of antenna power adder 241, noise power estimator 242, and directional beam formers 244-1 to 244-NB are the same as those in CFAR section 214 illustrated in FIG. 6. On the other hand, CFAR section 214a illustrated in FIG. 12 is different from CFAR section 214 illustrated in FIG. 6 in that beam power adder 601 is provided, and single determiner 245a is provided for NB beams.

Beam power adder 601 selects predetermined number N_sel_beam of beam directions in an order of higher beam reception power PowerBeam($\theta_{BEAM(nb)}$, k,$f_s$,w) calculated by each directional beam former 244 from among NB beam directions. Beam power adder 601 calculates power PowerBeamSum(k,$f_s$,w) obtained by adding beam reception powers together in the selected N_sel_beam beam directions, and outputs the calculated power to determiner 245a.

Beam power adder 601 outputs beam selection information "BEAM_SEL(k,$f_s$,w)" including beam indexes nb corresponding to the predetermined number N_sel_beam of beam directions to determiner 245a. Hereinafter, a beam index included in beam selection information BEAM_SEL(k,$f_s$,w) is indicated by "nb_sel".

An operation of beam power adder 601 is not limited to an operation of selecting predetermined number N_sel_beam of beam directions in an order of higher beam reception power PowerBeam($\theta_{BEAM(nb)}$, k,$f_s$,w).

As another operation of beam power adder 601, for example, beam power adder 601 may make the number of selected beam directions adaptively variable. Beam power adder 601 may select beam directions of an adaptively variable number, and may calculate PowerBeamSum(k,$f_s$,w) by using beam reception powers in the selected beam directions.

For example, beam power adder 601 calculates average beam reception power PowerBeamAve(k,$f_s$,w) of beam reception powers in NB beam directions as in the following expression.

$$PowerBeamAve(k, f_s, w) = \frac{1}{NB}\sum_{nb=1}^{NB} PowerBeam(\theta_{BEAM(nb)}, k, f_s, w)$$ (Expression 21)

Beam power adder 601 uses, as a determination threshold value, a value obtained by multiplying average beam reception power PowerBeamAve(k,$f_s$,w) by a predetermined value (Threshold_BEAM_SEL). Predetermined value Threshold_BEAM_SEL is an integer of 1 or greater.

Beam power adder 601 adds beam reception power exceeding the determination threshold value among NB beam reception powers PowerBeam($\theta_{BEAM(nb)}$, k,$f_s$,w), and thus calculates power PowerBeamSum(k,$f_s$,w) represented in the following expression.

$$PowerBeamSum(k, f_s, w) = \sum_{nb\_sel} PowerBeam(\theta_{BEAM(nb\_sel)}, k, f_s, w)$$ (Expression 22)

Here, nb_sel indicates a beam index satisfying the following expression among NB beam reception powers.

PowerBeam($\theta_{BEAM(nb\_sel)}$,k,$f_s$,w)>Threshold_
Beam_Sel×PowerBeamAve(k,$f_s$,w) (Expression 23)

The number of beam indexes satisfying expression (23) may be zero.

Beam power adder 601 stores a beam index satisfying Expression (23) into beam selection information BEAM_SEL(k,$f_s$,w), and outputs the beam selection information to determiner 245a. Hereinafter, a beam index included in beam selection information BEAM_SEL(k,$f_s$,w) is indicated by nb_sel.

Determiner 245a performs the following comparison determination by using an output from noise power estimator 242 and an output from beam power adder 601, for each of time index k and Doppler frequency index $f_s$.

For example, as represented in the following expression, determiner 245a compares a value (SF×PowerCL(k,$f_s$,w)) obtained by multiplying noise power estimation value PowerCL(k,$f_s$,w) by predetermined scale factor SF with power PowerBeamSum(k,$f_s$,w) that is output from beam power adder 601. Here, SF is greater than 0.

PowerBeamSum(k,$f_s$,w)>SF×PowerCL(k,$f_s$,w) (Expression 24)

Determiner 245a determines OK in a case where Expression (24) is satisfied, and determines NG in a case where expression (24) is not satisfied. Determiner 245a outputs information indicating time index $k_{\_cfar}$ and Doppler frequency index $f_{s\_cfar}$ determined as being OK, to direction estimator 215. In other words, in a case where an addition value of beam reception powers in some beam directions among a predetermined number of beam directions is greater than a threshold value, direction estimator 215 determines that a target may be present in a corresponding cell, and estimates an arrival direction.

Determiner 245a outputs beam selection information BEAM_SEL($k_{\_cfar}$,$f_{s\_cfar}$,w) corresponding to power PowerBeamSum(k,$f_s$,w) providing OK determination, to direction estimator 215.

As mentioned above, a description has been made of an operation of CFAR section 214a.

Direction estimator 215 (for example, refer to FIG. 1) extracts corrected virtual reception array correlation vector $h_{aftercal}(k_{\_cfar},f_{s\_cfar},w)$ from corrected virtual reception array correlation vector $h_{aftercal}(k,f_s,w)$ that is input from signal corrector 213 on the basis of time index $k_{\_cfar}$, Doppler frequency index $f_{s\_cfar}$, and beam selection information BEAM_SEL($k_{\_cfar}$,$f_{s\_cfar}$,w) determined as being OK by determiner 245a of CFAR section 214a. Direction estimator 215 performs, for example, the same direction estimation process as in the embodiment by using extracted corrected virtual reception array correlation vector $h_{aftercal}(k_{\_cfar},f_{s\_cfar},w)$.

Direction estimator 215 may restrict a range of an angular direction by using beam index nb_sel included in beam selection information BEAM_SEL($k_{\_cfar}$,$f_{s\_cfar}$,w) that is input from CFAR section 214a. For example, direction estimator 215 may calculate direction estimation evaluation function value $P_H(\theta, k_{\_cfar},f_{s\_cfar},w)$ in a range ($\theta_{BEAM(nb\_sel)}-\Delta_L \leq \theta_u \leq \theta_{BEAM(nb\_sel)}+\Delta_L$) corresponding to predetermined range $\Delta_L$ with respect to beam direction $\theta_{BEAM(nb\_sel)}$, and may detect a peak direction.

As mentioned above, according to the configuration of CFAR section 214a, in addition to the effect of the embodiment, the following effects can be further achieved.

CFAR section 214a according to Variation 3 adds beam reception powers (for example, a predetermined number of beam reception powers corresponding to a high beam reception power or beam reception powers selected through adaptive threshold value determination) in some beam directions among outputs of NB beam reception powers of respective directional beam formers 244. Consequently, it is possible to reduce a probability of adding noise component power included in each of beam reception powers in NB beam directions.

CFAR section 214a can extract signal component powers present in different directions and then obtain an addition value of the powers. Consequently, in a case where target reflected waves arrive from a plurality of directions at identical time index k and Doppler frequency index $f_s$, beam power adder 601 can add signal powers of reflected waves arriving from the respective directions together. Thus, it is possible to increase a probability of being determined as being OK in a determination process performed by determiner 245a in the subsequent stage.

Therefore, for example, it is possible to increase a detection ratio in CFAR section 214a when targets that are located at a substantially identical distance and have a substantially identical relative speed are present in a plurality of directions. Particularly, an effect of improving a detection ratio is high in a case where a target is a weak reflection object or is present far away.

Whereas CFAR section 214 illustrated in FIG. 6 has a configuration in which determiner 245 performs a determination process on each of outputs of NB beam reception powers from each directional beam former 244, CFAR section 214a illustrated in FIG. 12 has a configuration in which determiner 245a performs a determination process on an output from beam power adder 601. In other words, determiner 245a collectively performs determination on a plurality of beam directions. Thus, CFAR section 214a can simplify the determination process, and thus achieves, for example, an effect of reducing a storage capacity (memory capacity) for primarily preserving outputs from directional beam former 244.

In FIG. 12, a description has been made of a case where determiner 245a collectively performs detection determination on targets in a plurality of beam directions, but is not limited thereto. For example, CFAR section 214a may divide NB beams into a plurality of groups, and may perform target detection determination on each group. In this case, it is also possible to achieve an effect of reducing a calculation amount or a storage capacity compared with a case of performing target detection determination for each beam.

Variation 4 of One Embodiment

In Variation 4, a CFAR process is different from that in the embodiment.

Figure 13:
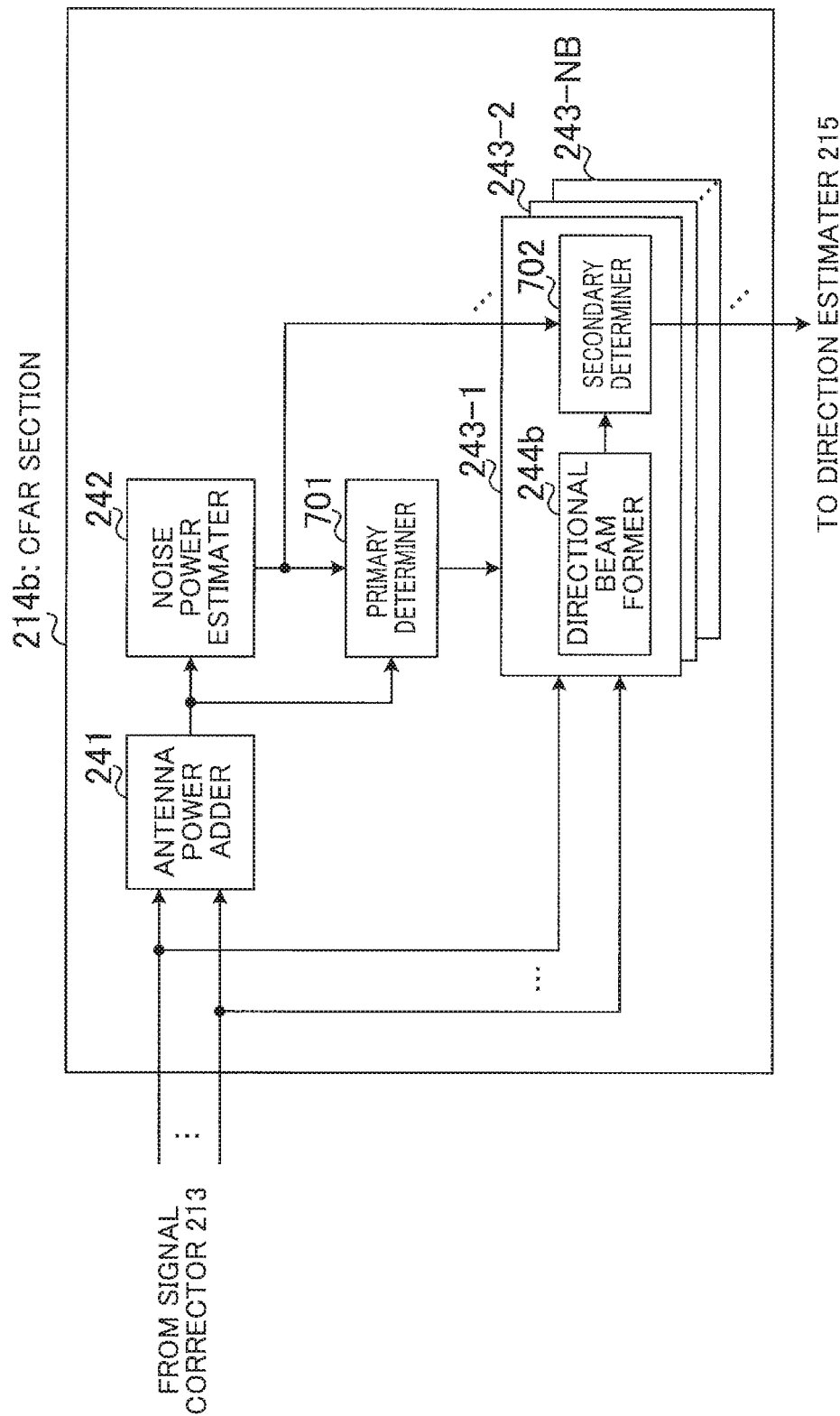
FIG. 13 is a block diagram illustrating an internal configuration example of a CFAR section according to Variation 4.

FIG. 13 is a block diagram illustrating a configuration example of CFAR section 214b according to Variation 4. In FIG. 13, the same constituent element as in FIG. 6 will be given an identical reference numeral, and a description thereof will be omitted.

Specifically, in CFAR section 214b illustrated in FIG. 13, operations of antenna power adder 241 and noise power estimator 242 are the same as those in CFAR section 214 illustrated in FIG. 6. On the other hand, CFAR section 214b illustrated in FIG. 13 is different from CFAR section 214 illustrated in FIG. 6 in that primary determiner 701 is provided, and secondary determiner 702 is provided instead of determiner 245.

For example, as represented in the following expression, primary determiner 701 performs comparison determination between a value (SF1×PowerCL(k,$f_s$,w)) obtained by multiplying noise power estimation value PowerCL(k,$f_s$,w) by predetermined primary determination scale factor SF1 and virtual reception array power PowerFT(k,$f_s$,w) for each time index k and Doppler frequency index $f_s$. Here, SF1 is greater than 0.

$$\text{PowerFT}(k,f_s,w) > \text{SF1} \times \text{PowerCL}(k,f_s,w) \quad \text{(Expression 25)}$$

Primary determiner 701 determines primary OK in a case where expression (25) is satisfied, and determines primary NG in a case where expression (25) is not satisfied. Primary determiner 701 outputs information indicating time index $k_{\_cfar1st}$ and Doppler frequency index $f_{s\_cfar1st}$ determined as being primary OK, to detector 243 (directional beam former 244b and secondary determiner 702).

For example, directional beam former 244b multiplies NB directivity weight vectors $(W_{BEAM}(\theta_{BEAM(1)})$, $W_{BEAM}(\theta_{BEAM(2)})$, . . . , and $W_{BEAM}(\theta_{BEAM(NB)}))$ with different beam directions by using corrected virtual reception array correlation vector $h_{aftercal}(k_{\_cfar1st},f_{s\_cfar1st},w)$ of time index $k_{\_cfar1st}$ and Doppler frequency index $f_{s\_cfar1st}$ determined as being primary OK, and thus calculates beam reception powers PowerBeam($\theta_{BEAM(nb)},k_{\_cfar1st},f_{s\_cfar1st},w$) in respective beam directions ($\theta_{BEAM(1)}$, $\theta_{BEAM(2)}$, . . . , and $\theta_{BEAM(NB)}$) as in the following expression. Here, nb indicates a beam index, and nb is 1, . . . , and NB.

$$\text{PowerBeaM}(\theta_{BEAM(nb)},k_{\_cfar1st},f_{s\_cfar1st},w) = |W_{BEAM}(\theta_{BEAM(nb)})^H h_{aftercal}(k_{\_cfar1st},f_{s\_cfar1st},w)|^2 \quad \text{(Expression 26)}$$

As represented in the following expression, secondary determiner 702 performs comparison determination between a value (SF2×PowerCL($k_{\_cfar1st},f_{s\_cfar1st}$,w)) obtained by multiplying noise power estimation value PowerCL($k_{\_cfar1st},f_{s\_cfar1st}$,w) by predetermined secondary determination scale factor SF2 and PowerBeam($\theta_{BEAM(nb)},k_{\_cfar1st},f_{s\_cfar1st}$,w) that is an output from directional beam former 244b for each time index $k_{\_cfar1st}$ and Doppler frequency index $f_{s\_cfar1st}$ determined as being primary OK. Here, nb is 1, . . . , and NB, and SF2 is greater than 0.

$$\text{PowerBeam}(\theta_{BEAM(nb)},k_{\_cfar2nd},f_{s\_cfar2nd},w) > \text{SF2} \times \text{PowerCL}(k_{\_cfar2nd},f_{s\_cfar2nd},w) \quad \text{(Expression 27)}$$

For example, secondary determiner 702 determines secondary OK in a case where Expression (27) is satisfied, and determines secondary NG in a case where Expression (27) is not satisfied. Secondary determiner 702 outputs information indicating beam direction $\theta_{BEAM\_cfar}$, time index $k_{\_cfar2nd}$, and Doppler frequency index $f_{s\_cfar2nd}$ determined as being secondary OK, to direction estimator 215 (for example, refer to FIG. 1).

Direction estimator 215 (for example, refer to FIG. 1) extracts corrected virtual reception array correlation vector $h_{aftercal}(k_{\_cfar2nd},f_{s\_cfar2nd},w)$ from corrected virtual reception array correlation vector $h_{aftercal}(k,f_s,w)$ that is input from signal corrector 213 on the basis of beam direction $\theta_{BEAM\_cfar2nd}$, time index $k_{\_cfar2nd}$, and Doppler frequency index $f_{s\_cfar2nd}$ determined as being secondary OK by secondary determiner 702 of CFAR section 214b. Direction estimator 215 performs a direction estimation process by using extracted corrected virtual reception array correlation vector $h_{aftercal}(k_{\_cfar2nd},f_{s\_cfar2nd},w)$. An operation for the direction estimation process is the same as that in the embodiment, and thus description thereof will be omitted.

As mentioned above, according to the configuration of CFAR section 214b, in addition to the effect of the embodiment, the following effects can be further achieved.

In CFAR section 214b according to Variation 4, primary determiner 701 sets, as a test cell among a plurality of cells, a cell in which reception power (that is, a power addition value) PowerFT(k,f$_s$,w) of virtual reception array antennae, calculated by using reflected wave signals in the respective cells, is greater than a determination threshold value that is a value obtained by multiplying noise power estimation value PowerCL(k,f$_s$,w) by scale factor SF1. Secondary determiner 702 compares the beam reception power in the cell set as a test cell with a determination threshold value that is a value obtained by multiplying the noise power estimation value by scale factor SF2.

Consequently, in CFAR section 214b, corrected virtual reception array correlation vector $h_{aftercal}$(k$_{\_cfar2nd}$, f$_{s\_cfar2nd}$,w) multiplied by a directivity weight vector in directional beam former 244b is restricted to time index k and Doppler frequency index f$_s$ determined as being OK by primary determiner 701. Therefore, in CFAR section 214b, the number of times of multiplying a directivity weight vector can be reduced, and thus it is possible to reduce a calculation amount, compared with CFAR section 214 (refer to FIG. 6).

Hereinafter, a description will be made of primary determination scale factor SF1 used in primary determiner 701.

As SF1 increases, the number of cases satisfying Expression (25) (that is, cases determined as being primary OK) becomes smaller. Therefore, a reflected wave of a target that can be detected by secondary determiner 702 in a case where primary determiner 701 is not provided (or SF1=0) causes primary NG determination when SF1 is too large, and thus may not be detected by secondary determiner 702.

Thus, SF1 may be set such that a reflected wave of a target that can be detected by secondary determiner 702 in a case where primary determiner 701 is not provided (or SF1=0) causes primary OK determination even when primary determiner 701 is provided. In this case, deterioration in a detection ratio due to provision of primary determiner 701 does not occur.

Therefore, SF1 may be set, for example, as follows on the basis of secondary determination scale factor SF2 used in secondary determiner 702.

Here, magnitudes of NB directivity weight vectors with different beam directions may be set to satisfy the following expression. Here, nb indicates a beam index, and nb is 1, . . . , and NB.

$$W_{BEAM}(\theta_{BEAM(nb)})^H W_{BEAM}(\theta_{BEAM(nb)}) = \text{const} \quad \text{(Expression 28)}$$

In a case where Expression (28) is satisfied, PowerBeam ($\theta_{BEAM(nb)}$,k$_{\_cfar1st}$,f$_{s\_cfar1st}$,w) that is an output from directional beam former 244b satisfies the following expression.

$$\text{PowerBeam}(\theta_{BEAM(nb)}, k_{\_cfar1st}, f_{s\_cfar1st}, w) \leq \text{const} \times \text{PowerFT}(k, f_s, w) \quad \text{(Expression 29)}$$

Expression (29) indicates that beam reception power PowerBeam($\theta_{BEAM(nb)}$,k$_{\_cfar1st}$,f$_{s\_cfar1st}$,w) changes depending on a beam direction, and an upper limit thereof is const×PowerFT(k,f$_s$,w).

Therefore, primary determiner 701 sets SF1 such that an upper limit value of secondary determination scale factor SF2 used in secondary determiner 702 causes primary OK determination. In other words, an upper limit value of SF1 is set to SF2/const. For example, in a case where const is 1, SF1 is a value equal to or less than SF2.

For example, a relationship of SF1≤SF2/const is set, and thus a reflected wave of a target that can be determination by secondary determiner 702 in a case where primary determiner 701 is not provided (or SF1=0) causes primary OK determination even when primary determiner 701 is provided.

In a case where a relationship of SF1<SF2/const is set, an unnecessary case occurs in which primary OK determination is caused but secondary NG determination is caused, and thus the number of times of multiplying a directivity weight vector may be increased. Therefore, a relationship of SF1=SF2/const is set, and this preferable in terms of performance and a calculation amount.

On the other hand, in a case where a relationship of SF1>SF2/const is set, a reflected wave of a target that can be detected by secondary determiner 702 in a case where primary determiner 701 is not provided (or SF1=0) may not be detected even when primary determiner 701 is provided. However, in a case where there is an upper limit in the number of times of multiplying a directivity weight vector due to a restriction of a calculation circuit or a restriction of a processing time, the setting such as SF1>SF2/const may be used.

In a case where a relationship of SF1≤SF2/const is set, when there is an upper limit in the number of times of multiplying a directivity weight vector due to a restriction of a calculation circuit or a restriction of a processing time, an upper limit may be provided in the number of time index k and Doppler frequency index f$_s$ (that is, the number of cells) determined as being OK.

In a case where the number of cells causing primary OK determination exceeds an upper limit value, CFAR section 214b more preferentially sets a cell included in a preset region as a cell (for example, a test cell) subjected to secondary determination than other cells among the cells causing primary OK determination. For example, in a case where radar apparatus 10 is mounted on a vehicle or the like, the following control may be added by taking into consideration collision safety. For example, primary determiner 701 preferentially counts the number of time index k and Doppler frequency index f$_s$ (that is, the number of cells) determined as being OK from a short distance range or a range in which a Doppler frequency component is high in a positive or negative direction. In a case where a count number of time index k and Doppler frequency index f$_s$ determined as being OK exceeds an upper limit number, with respect to the subsequent distance range or Doppler frequency range, even though primary OK determination is caused, primary determiner 701 determines primary NG.

Variation 5 of One Embodiment

Figure 14:
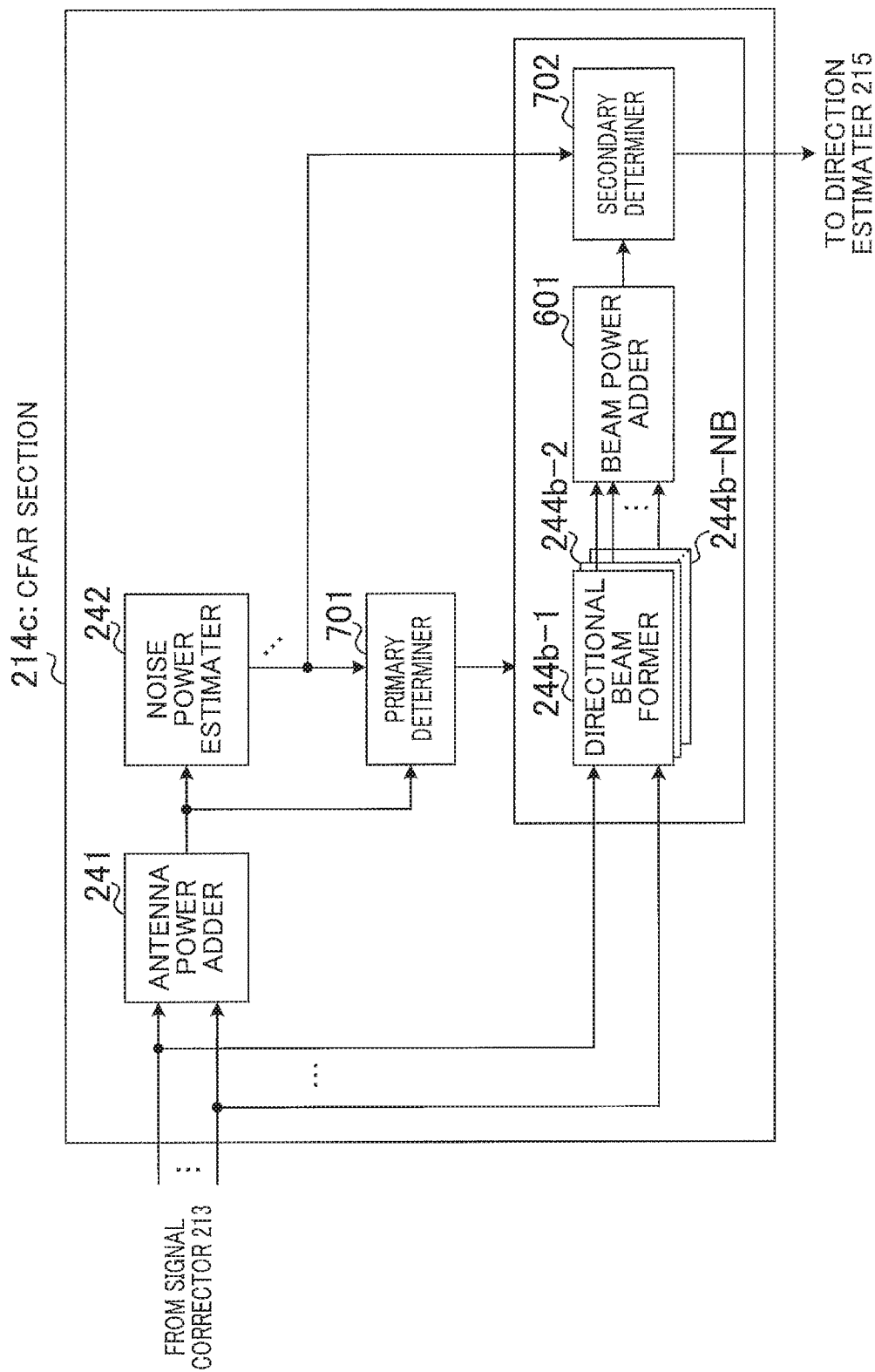
FIG. 14 is a block diagram illustrating an internal configuration example of a CFAR section according to Variation 5.

The configuration of CFAR section 214a described in Variation 3 and the configuration of CFAR section 214b described in Variation 4 may be combined with each other. FIG. 14 is a block diagram illustrating a configuration example of CFAR section 214c according to Variation 5. CFAR section 214c performs the same beam reception power addition process as in Variation 3 and the same primary determination process and secondary determination process as in Variation 4, and can thus achieve an effect of reducing the number of times of multiplying a directivity weight vector.

A description will be made of an operation of a portion that is different from that in Variation 3 or 4.

As represented in the following expression, secondary determiner 702 performs comparison determination between a value (SF2×PowerCL(k$_{\_cfar1st}$,f$_{s\_cfar1st}$, w)) obtained by multiplying noise power estimation value PowerCL (k$_{\_cfar1st}$, f$_{s\_cfar1st}$,w) by predetermined secondary determination scale factor SF2 and PowerBeamSum($k_{\_cfar1st}$, $f_{s\_cfar1st}$,w) that is an output from beam power adder 601 for each time index $k_{\_cfar1st}$ and Doppler frequency index $f_{s\_cfar1st}$ determined as being primary OK. Here, SF2 is greater than 0.

$$\text{PowerBeamSum}(k_{\_cfar2nd}, f_{s\_cfar2nd}, w) > \text{SF2} \times \text{PowerCL}(k_{\_cfar2nd}, f_{s\_cfar2nd}, w) \quad \text{(Expression 30)}$$

Secondary determiner 702 determines secondary OK in a case where Expression (30) is satisfied, and determines secondary NG in a case where Expression (30) is not satisfied. Secondary determiner 702 outputs information indicating time index $k_{\_cfar2nd}$ and Doppler frequency index $f_{s\_cfar2nd}$ determined as being secondary OK, to direction estimator 215 (for example, refer to FIG. 1). Secondary determiner 702 outputs beam selection information BEAM_SEL($k_{\_cfar2nd}$ $f_{s\_cfar2nd}$,w) corresponding to beam reception power (addition power) determined as being secondary OK to direction estimator 215.

Direction estimator 215 extracts corrected virtual reception array correlation vector $h_{aftercal}(k_{\_cfar2nd}, f_{s\_cfar2nd},w)$ from corrected virtual reception array correlation vector $h_{aftercal}(k,f_s,w)$ that is input from signal corrector 213 on the basis of time index $k_{\_cfar2nd}$, Doppler frequency index $f_{\_cfar2nd}$, and beam selection information BEAM_SEL ($k_{\_cfar2nd}, f_{s\_cfar2nd}$,w) determined as being secondary OK by secondary determiner 702 of CFAR section 214c. Direction estimator 215 performs, for example, the same direction estimation process as in the embodiment by using extracted corrected virtual reception array correlation vector $h_{aftercal}(k_{\_cfar2nd}, f_{s\_cfar2nd},w)$.

Direction estimator 215 may restrict a range of an angular direction by using beam index nb_sel included in beam selection information BEAM_SEL($k_{\_cfar2nd}, f_{s\_cfar2nd}$,w) that is input from CFAR section 214c. For example, direction estimator 215 may calculate direction estimation evaluation function value $P_H(\theta, k_{\_cfar2nd}, f_{s\_cfar2nd}, W)$ in a range ($\theta_{BEAM(nb\_sel)} - \Delta_L \leq \theta_u \leq \theta_{BEAM(nb\_sel)} + \Delta_L$) corresponding to predetermined range $\Delta_L$ with respect to beam direction $\theta_{BEAM(nb\_sel)}$, and may detect a peak direction.

Variation 6 of One Embodiment

In the embodiment or Variations 1 to 5 (for example, refer to FIG. 6, 12, 13, or 14), a description has been made of a case where antenna power adder 241 calculates virtual reception array power PowerFT(k,$f_s$,w) by using an output from signal corrector 213. However, antenna power adder 241 may calculate an equivalent power value even though a virtual reception array power is calculated by using an output from Doppler analyzer 212 not subjected to phase correction.

Figure 15:
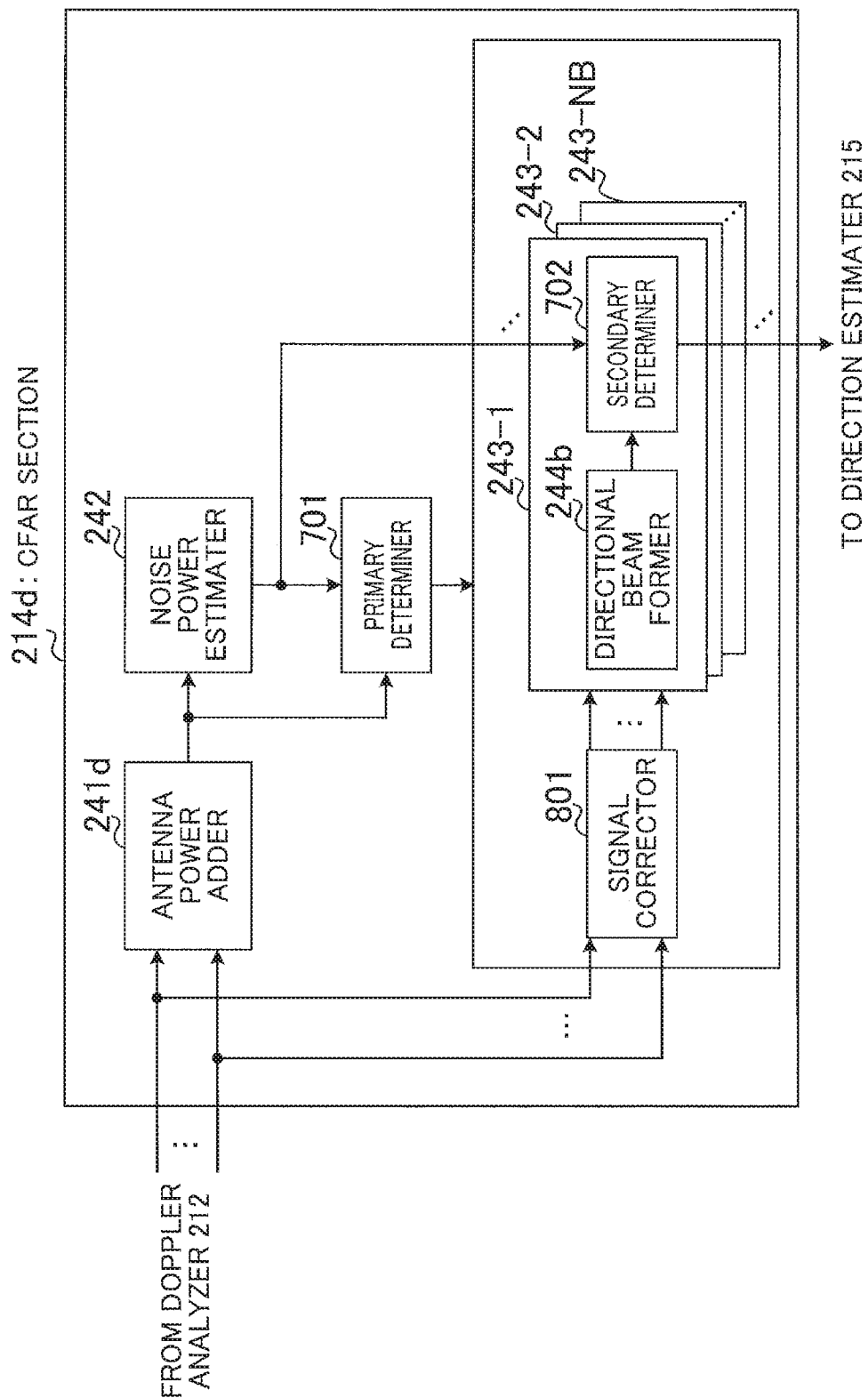
FIG. 15 is a block diagram illustrating an internal configuration example of a CFAR section according to Variation 6.
Figure 16:
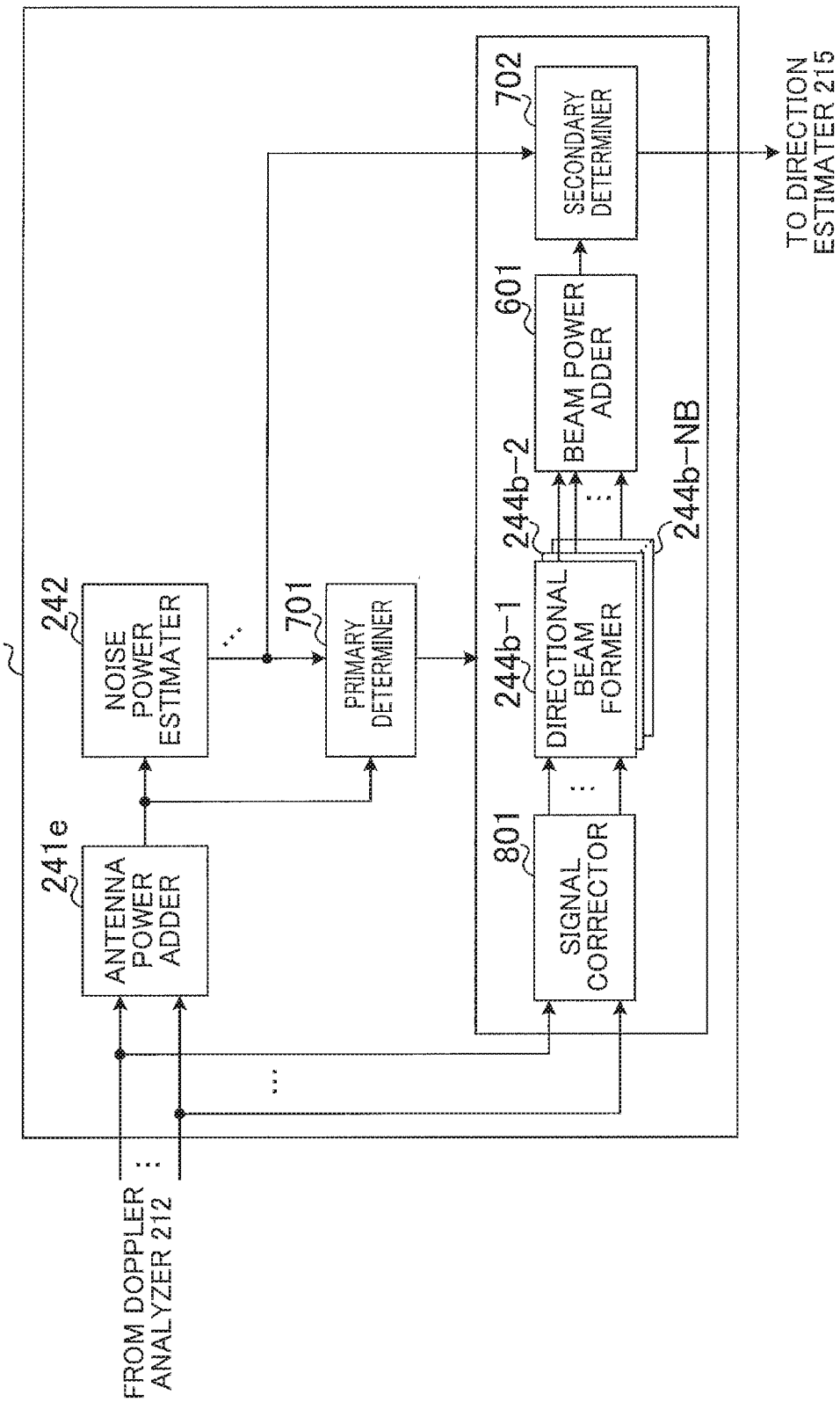
FIG. 16 is a block diagram illustrating an internal configuration example of the CFAR section according to Variation 6.

As an example, FIG. 15 is a block diagram illustrating a configuration example of CFAR section 214d in a case where the present variation is applied to Variation 4 (refer to FIG. 13). FIG. 16 is a block diagram illustrating a configuration example of CFAR section 214e in a case where the present variation is applied to Variation 5 (refer to FIG. 14).

In the present variation, in radar apparatus 10 (for example, refer to FIG. 1), signal corrector 213 is not provided (not illustrated), and an output from Doppler analyzer 212 of signal processor 207 is input to CFAR section 214d or CFAR section 214e. In FIGS. 15 and 16, signal corrector 801 is provided compared with FIGS. 13 and 14.

Signal corrector 801 performs the same signal correction as in signal corrector 213 on an output from Doppler analyzer 212 for each of time index $k_{\_cfar1st}$ and Doppler frequency index $f_{s\_cfar1st}$ determined as being primary OK by primary determiner 701.

As mentioned above, in the present variation, signal correction is performed on time index k and Doppler frequency index $f_s$ determined as being primary OK by primary determiner 701. In other words, signal correction is not performed on time index k and Doppler frequency index $f_s$ determined as being primary NG by primary determiner 701. Consequently, it is possible to reduce the number of times of multiplication for signal correction and thus to reduce a calculation amount.

Hereinafter, a description will be made of an operation that is different from that in the CFAR process in the embodiment, Variation 4, or Variation 5.

Antenna power adder 241d or 241e adds together reception powers in the respective virtual reception antennae, represented by elements of the virtual reception array correlation vector by using the w-th virtual reception array correlation vector h(k,$f_s$,w) that is input from Doppler analyzer 212, as in the following expression. For example, virtual reception array power PowerFT(k,$f_s$,w) obtained by adding reception powers in the respective virtual reception antennae is calculated according to the following expression.

$$\text{PowerFT}(k,f_s,w) = h(k,f_s,w)^H h(k,f_s,w) \quad \text{(Expression 31)}$$

Signal corrector 801 performs deviation correction between the array antennae and transmission phase correction due to time-division transmission on virtual reception array correlation vectors $h(k_{\_cfar1st}, f_{s\_cfar1st},w)$ of time index $k_{\_cfar1st}$ and Doppler frequency index $f_{s\_cfar1st}$ determined as being primary OK by primary determiner 701. For example, signal corrector 801 multiplies virtual reception array correlation vectors $h(k_{\_cfar1st}, f_{s\_cfar1st},w)$ by a correction coefficient as represented in the following expression, and thus calculates corrected virtual reception array correlation vector $h_{aftercal}(k_{\_cfar1st}, f_{s\_cfar1st},w)$.

$$h_{aftercal}(k_{\_cfar1st}, f_{s\_cfar1st}, w) = C_{VA} \circ C_{TX} \circ h(k_{\_cfar1st}, f_{s\_cfar1st}, w) \quad \text{(Expression 32)}$$

Directional beam former 244b multiplies NB directivity weight vectors ($W_{BEAM}(\theta_{BEAM(1)})$, $W_{BEAM}(\theta_{BEAM(2)})$, . . . , and $W_{BEAM}(\theta_{BEAM(NB)})$) with different beam directions by using corrected virtual reception array correlation vector $h_{aftercal}(k_{\_cfar1st}, f_{s\_cfar1st},w)$ of time index $k_{\_cfar1st}$ and Doppler frequency index $f_{s\_cfar1st}$ determined as being primary OK and output from signal corrector 801, and thus calculates beam reception powers PowerBeam($\theta_{BEAM(nb)}, k_{\_cfar1st}, f_{s\_cfar1st}$,w) in respective beam directions ($\theta_{BEAM(1)}, \theta_{BEAM(2)}$, . . . , and $\theta_{BEAM(NB)}$).

As mentioned above, one embodiment according to the present disclosure has been described.

Other Embodiments (1) The present disclosure does not depend on a multiplexing method of transmission signals, and can thus achieve the same effect as in the embodiment even though transmission signals from a plurality of transmission antennae 108 are transmitted by using code division multiplexing or frequency division multiplexing instead of time division multiplexing.

(2) In the embodiment, as an example, a description has been made of the MIMO configuration including a plurality of transmission antennae 108 and a plurality of reception antenna 202. However, the present disclosure is not limited to the MIMO configuration. For example, in a case of a configuration in which there is single transmission antenna 108, and there are a plurality of reception antennae 202 (in a case of Nt=1 and Na>1) (that is, a SIMO configuration), the same effect as in the embodiment can also be achieved. For example, in a case of a configuration in which there are a plurality of transmission antennae 108, and there is single reception antenna 202 (in a case of Nt>1 and Na=1) (that is, a MISO configuration), the same effect as in the embodiment can also be achieved.

(3) In the embodiment, as an example, a description has been made of a process on two-dimensional components including a distance component (discrete time k) and a relative speed component (Doppler frequency index $f_s$), but the present disclosure may be applied to a one-dimensional process of one of the distance component and the relative speed component.

(4) In radar apparatus 10 illustrated in FIG. 1, radar transmitter 100 and radar receiver 200 may be disposed separately at locations physically separated from each other. In radar receiver 200 illustrated in FIG. 1, direction estimator 215 and other constituent elements may be disposed separately at locations physically separated from each other.

(5) Radar apparatus 10 has, although not illustrated, for example, a central processing unit (CPU), a storage medium such as a read only memory (ROM) storing a control program, and a work memory such as a random access memory (RAM). In this case, the function of each constituent element is realized by the CPU executing the control program. However, a hardware configuration of radar apparatus 10 is not limited to such an example. For example, each functional element of radar apparatus 10 may be realized by an integrated circuit (IC). Each functional element may be separately formed of one chip, and may be formed of one chip to include a part or the whole thereof.

As mentioned above, various embodiments have been described with reference to the drawings, but, needless to say, the present disclosure is not limited to the embodiments. It is clear that a person skilled in the art can conceive of various changes or modifications within the category disclosed in the claims, and it is understood that they are naturally included in the technical scope of the present disclosure. The respective constituent elements in the embodiment may be combined with each other within the scope without departing from the spirit of the disclosure.

In the respective embodiments, the present disclosure has been described to be configured by using hardware as an example, but the present disclosure may be realized by software through cooperation with hardware.

Each functional block used in description of each embodiment is generally realized by an LSI that is an integrated circuit. The integrated circuit may control each functional block used in description of the embodiment, and may include an input terminal and an output terminal. The integrated circuit may be separately formed of one chip, and may be formed of one chip to include a part or the whole thereof. The term LSI is used here, but may be referred to as an IC, a system LSI, a super LSI, or an ultra LSI depending on a difference in the degree of integration.

A method of forming an integrated circuit is not limited to an LSI, and the integrated circuit may be realized by using a dedicated circuit or a general purpose processor. After the LSI is manufactured, a field programmable gate array (FPGA) that is programmable or a reconfigurable processor in which connection or setting of circuit cells of the inside of the LSI is reconfigurable may be used.

In a case where an integrated circuit technique that replaces an LSI appears as a result of advances in semiconductor techniques or other techniques derived therefrom, a functional block may naturally be integrated using the techniques. A biotechnology may be applied.

Summary of Present Disclosure

A radar apparatus according to one example of the present disclosure includes: transmission circuitry that transmits a radar signal by using a transmission antenna; and reception circuitry that receives, by using a reception antenna, a reflected wave signal of the radar signal that is reflected at a target and estimates an arrival direction of the reflected wave signal, in which the reception circuitry calculates a first reception power in each of a predetermined number of beam directions by using the reflected wave signal in a first cell among a plurality of cells into which a region represented by at least one of a distance component and a Doppler frequency component is divided, calculates a second reception power based on reception powers of reception array antennae by using the reflected wave signal in a peripheral cell of the first cell among the plurality of cells, and determines whether or not a target is present in the first cell based on a comparison result between the first reception power and a first threshold value that is a value obtained by multiplying the second reception power by a first coefficient.

In the radar apparatus according to the one example of the present disclosure, the reception circuitry determines that the target is present in the first cell in which the first reception power in at least one of the predetermined number of beam directions is greater than the first threshold value.

In the radar apparatus according to the one example of the present disclosure, the reception circuitry determines that the target is present in the first cell in a case where an addition value of the first reception powers in some beam directions among the predetermined number of beam directions is greater than the first threshold value.

In the radar apparatus according to the one example of the present disclosure, the reception circuitry estimates the arrival direction for the first cell in which the target is determined as being present.

In the radar apparatus according to the one example of the present disclosure, the reception circuitry sets, as the first cell among the plurality of cells, a cell in which a third reception power corresponding to the reception powers of the reception array antennae calculated by using the reflected wave signals in the respective cells is greater than a second threshold value that is a value obtained by multiplying the second reception power by a second coefficient, and compares the first reception power in the first cell with the first threshold value.

In the radar apparatus according to the one example of the present disclosure, the second coefficient is set based on the first coefficient.

In the radar apparatus according to the one example of the present disclosure, in a case where the number of cells in which the third reception power is greater than the second threshold value exceeds an upper limit value, the reception circuitry sets a cell included in a previously set region set among the cells in which the third reception power is greater than the second threshold value, as the first cell, more preferentially than the other cells.

In the radar apparatus according to the one example of the present disclosure, in a process of estimating the arrival direction for the first cell, the reception circuitry estimates the arrival direction in a range that is set with a beam direction in which the first reception power is greater than the first threshold value as a reference among the predetermined number of beam directions.

In the radar apparatus according to the one example of the present disclosure, the reception array antennae include virtual elements formed of a plurality of the transmission antennae and a plurality of the reception antennae.

A target determination method according to one example of the present disclosure includes: transmitting a radar signal by using a transmission antenna; and receiving, by using a reception antenna, a reflected wave signal of the radar signal that is reflected at a target and estimating an arrival direction of the reflected wave signal, in which the method includes: calculating a first reception power in each of a predetermined number of beam directions by using the reflected wave signal in a first cell among a plurality of cells into which a region represented by at least one of a distance component and a Doppler frequency component is divided; calculating a second reception power based on reception powers of reception array antennae by using the reflected wave signal in a peripheral cell of the first cell among the plurality of cells; and determining whether or not a target is present in the first cell based on a comparison result between the first reception power and a first threshold value that is a value obtained by multiplying the second reception power by a first coefficient.

In the target determination method according to the one example of the present disclosure, it is determined that the target is present in the first cell in which the first reception power in at least one of the predetermined number of beam directions is greater than the first threshold value.

In the target determination method according to the one example of the present disclosure, it is determined that the target is present in the first cell in a case where an addition value of the first reception powers in some beam directions among the predetermined number of beam directions is greater than the first threshold value.

In the target determination method according to the one example of the present disclosure, the arrival direction is estimated for the first cell in which the target is determined as being present.

In the target determination method according to the one example of the present disclosure, a cell in which a third reception power corresponding to the reception powers of the reception array antennae calculated by using the reflected wave signals in the respective cells is greater than a second threshold value that is a value obtained by multiplying the second reception power by a second coefficient is set as the first cell among the plurality of cells, and in which the first reception power in the first cell is compared with the first threshold value.

In the target determination method according to the one example of the present disclosure, the second coefficient is set based on the first coefficient.

In the target determination method according to the one example of the present disclosure, in a case where the number of cells in which the third reception power is greater than the second threshold value exceeds an upper limit value, a cell included in a previously set region among the cells in which the third reception power is greater than the second threshold value is set as the first cell, more preferentially than the other cells.

In the target determination method according to the one example of the present disclosure, in a process of estimating the arrival direction for the first cell, the arrival direction is estimated in a range that is set with a beam direction in which the first reception power is greater than the first threshold value as a reference among the the predetermined number of beam directions.

In the target determination method according to the one example of the present disclosure, the reception array antennae include virtual elements formed of a plurality of the transmission antennae and a plurality of the reception antennae.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2018-179096, filed on Sep. 25, 2018, the disclosure of which including the specification, drawings and abstract is incorporated herein by reference in its entirety.

INDUSTRIAL APPLICABILITY

The present disclosure is useful for a radar apparatus detecting a wide-angle range.

REFERENCE SIGNS LIST 10, 10$a$, 10$b$ Radar apparatus
100, 100$a$, 100$b$ Radar transmitter
101, 101$a$, 401 Radar transmission signal generator
102 Code generator
103 Modulator
104, 503 LPF
105 switching controller
106, 106$a$ Transmission switch
107, 107$a$ Transmission radio section
108 Transmission antenna
111 Code memory
112 DA converter
200, 200$b$ Radar receiver
201 Antenna system processor
202 Reception antenna
203, 501 Reception radio section
204 Amplifier
205 Frequency converter
206 Quadrature detector
207, 207$b$ Signal processor
208, 208$b$, 209 AD converter
210 Correlation calculator
211 Output switch
212 Doppler analyzer
213, 801 Signal corrector
214, 214$a$, 214$b$, 214$c$, 214$d$, 214$e$ CFAR section
215 Direction estimator
241, 241$d$, 241$e$ Antenna power adder
242 Noise power estimator
243 Detector
244, 244$b$ Directional beam former
5 245, 245$a$ Determiner
300 Reference signal generator
402 Modulated signal generator
403 VCO
404 Directional coupler
502 Mixer
504 R-FFT section
601 Beam power adder
701 Primary determiner
702 Secondary determiner

The invention claimed is:
1. A radar apparatus, comprising:
   transmission circuitry that transmits a radar signal by using a transmission antenna; and
   reception circuitry that receives, by using a reception antenna, a reflected wave signal of the radar signal that is reflected at a target and estimates an arrival direction of the reflected wave signal,
   wherein the reception circuitry
      calculates a first reception power in each of a predetermined number of beam directions by using the reflected wave signal in a first cell among a plurality of cells into which a region represented by at least one of a distance component and a Doppler frequency component is divided with a predetermined unit, wherein the distance component and the Doppler frequency component are components included in the reflected wave signal,
      calculates a second reception power based on reception powers of reception array antennae by using the reflected wave signal in a peripheral cell of the first cell included in a Constant False Alarm Rate (CFAR) window among the plurality of cells, wherein the CFAR window includes a guard cell disposed around the first cell and the peripheral cell disposed around the guard cell, and
      determines whether or not a target is present in the first cell based on a comparison result between the first reception power and a first threshold value that is a value obtained by multiplying the second reception power by a first coefficient.
2. The radar apparatus according to claim 1,
   wherein the reception circuitry determines that the target is present in the first cell in which the first reception power in at least one of the predetermined number of beam directions is greater than the first threshold value.
3. The radar apparatus according to claim 1,
   wherein the reception circuitry determines that the target is present in the first cell in a case where an addition value of the first reception powers in some beam directions among the predetermined number of beam directions is greater than the first threshold value.
4. The radar apparatus according to claim 1,
   wherein the reception circuitry estimates the arrival direction for the first cell in which the target is determined as being present.
5. The radar apparatus according to claim 1,
   wherein the reception circuitry
      sets, as the first cell among the plurality of cells, a cell in which a third reception power corresponding to the reception powers of the reception array antennae calculated by using the reflected wave signals in the respective cells is greater than a second threshold value that is a value obtained by multiplying the second reception power by a second coefficient, and compares the first reception power in the first cell with the first threshold value.
6. The radar apparatus according to claim 5, wherein the second coefficient is set based on the first coefficient.
7. The radar apparatus according to claim 5, wherein, in a case where the number of cells in which the third reception power is greater than the second threshold value exceeds an upper limit value, the reception circuitry sets a cell included in a previously set region set among the cells in which the third reception power is greater than the second threshold value, as the first cell, more preferentially than the other cells.
8. The radar apparatus according to claim 1,
   wherein, in a process of estimating the arrival direction for the first cell, the reception circuitry estimates the arrival direction in a range that is set with a beam direction in which the first reception power is greater than the first threshold value as a reference among the predetermined number of beam directions.
9. The radar apparatus according to claim 1,
   wherein the reception array antennae include virtual elements formed of a plurality of the transmission antennae and a plurality of the reception antennae.
10. A target determination method, comprising:
    transmitting a radar signal by using a transmission antenna;
    receiving, by using a reception antenna, a reflected wave signal of the radar signal that is reflected at a target and estimating an arrival direction of the reflected wave signal;
    calculating a first reception power in each of a predetermined number of beam directions by using the reflected wave signal in a first cell among a plurality of cells into which a region represented by at least one of a distance component and a Doppler frequency component is divided with a predetermined unit, wherein the distance component and the Doppler frequency component are components included in the reflected wave signal;
    calculating a second reception power based on reception powers of reception array antennae by using the reflected wave signal in a peripheral cell of the first cell included in Constant False Alarm Rate (CFAR) window among the plurality of cells, wherein the CFAR window includes a guard cell disposed around the first cell and the peripheral cell disposed around the guard cell; and
    determining whether or not a target is present in the first cell based on a comparison result between the first reception power and a first threshold value that is a value obtained by multiplying the second reception power by a first coefficient.
11. The target determination method according to claim 10,
    wherein it is determined that the target is present in the first cell in which the first reception power in at least one of the predetermined number of beam directions is greater than the first threshold value.
12. The target determination method according to claim 10,
    wherein it is determined that the target is present in the first cell in a case where an addition value of the first reception powers in some beam directions among the predetermined number of beam directions is greater than the first threshold value.
13. The target determination method according to claim 10,
    wherein the arrival direction is estimated for the first cell in which the target is determined as being present.
14. The target determination method according to claim 10,
    wherein a cell in which a third reception power corresponding to the reception powers of the reception array antennae calculated by using the reflected wave signals in the respective cells is greater than a second threshold value that is a value obtained by multiplying the second reception power by a second coefficient is set as the first cell among the plurality of cells, and
    wherein the first reception power in the first cell is compared with the first threshold value.

15. The target determination method according to claim 14, wherein the second coefficient is set based on the first coefficient.

16. The target determination method according to claim 14, wherein, in a case where the number of cells in which the third reception power is greater than the second threshold value exceeds an upper limit value, a cell included in a previously set region among the cells in which the third reception power is greater than the second threshold value is set as the first cell, more preferentially than the other cells.

17. The target determination method according to claim 10,
- wherein, in a process of estimating the arrival direction for the first cell, the arrival direction is estimated in a range that is set with a beam direction in which the first reception power is greater than the first threshold value as a reference among the predetermined number of beam directions.

18. The target determination method according to claim 10,
- wherein the reception array antennae include virtual elements formed of a plurality of the transmission antennae and a plurality of the reception antennae.

* * * * *